(12) United States Patent
Dreher

(10) Patent No.: US 12,515,353 B2
(45) Date of Patent: Jan. 6, 2026

(54) GRIPPING APPARATUS FOR HAIRPINS

(71) Applicant: GROB-WERKE GMBH & CO. KG, Mindelheim (DE)

(72) Inventor: Clemens Dreher, Mindelheim (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 637 days.

(21) Appl. No.: 17/614,207

(22) PCT Filed: May 28, 2020

(86) PCT No.: PCT/DE2020/100451
§ 371 (c)(1),
(2) Date: Nov. 24, 2021

(87) PCT Pub. No.: WO2020/239174
PCT Pub. Date: Dec. 3, 2020

(65) Prior Publication Data
US 2022/0258360 A1    Aug. 18, 2022

(30) Foreign Application Priority Data

May 28, 2019    (DE) .......................... 102019114221.0

(51) Int. Cl.
*B25J 15/00* (2006.01)
*H02K 15/0414* (2025.01)
*H02K 15/064* (2025.01)

(52) U.S. Cl.
CPC ...... *B25J 15/0052* (2013.01); *H02K 15/0414* (2013.01); *H02K 15/064* (2013.01)

(58) Field of Classification Search
CPC ............. B25J 15/0052; H02K 15/0414; H02K 15/064
See application file for complete search history.

(56) References Cited

U.S. PATENT DOCUMENTS 5,090,108 A * 2/1992 Banner ................ H02K 15/095
                                                          29/736
5,182,932 A    2/1993 Ritter et al.
(Continued)

FOREIGN PATENT DOCUMENTS

AT           520312 A4     3/2019
CN         106217105 A    12/2016
(Continued)

OTHER PUBLICATIONS

International Search Report; priority document.
German Search Report; priority document.

*Primary Examiner* — Minh N Trinh
(74) *Attorney, Agent, or Firm* — Greer, Burns & Crain, Ltd.

(57) ABSTRACT

A gripping apparatus for gripping at least one of several conductive members. The gripping apparatus is configured to grip different geometries of conductive members. The conductive member includes a first and a second conductive member end portion. The gripping apparatus includes a basic body, a first gripping device having a first gripper, wherein the first gripping device is configured to grip the first conductive member end portion or the second conductive member end portion of a predetermined conductive member via the first gripper. The gripping apparatus further has a second gripping device including a second gripper disposed to be movable relative to the basic body. The second gripping device is configured to move the second gripper relative to the first gripper such that the second gripper grips the predetermined conductive member at the second conductive member end portion or at the first conductive member end portion.

4 Claims, 13 Drawing Sheets

(56) References Cited

U.S. PATENT DOCUMENTS

| | | | | |
|---|---|---|---|---|
| 5,765,274 | A | * | 6/1998 | Beakes .............. H02K 15/0056 242/432 |
| 5,950,300 | A | * | 9/1999 | Newman ................ H02K 15/30 29/736 |
| 8,803,387 | B2 | | 8/2014 | Takeuchi et al. |
| 8,803,398 | B2 | | 8/2014 | Takeuchi et al. |
| 2016/0354884 | A1 | | 12/2016 | Grob |
| 2018/0233995 | A1 | | 8/2018 | Okuda et al. |
| 2019/0103792 | A1 | | 4/2019 | Matsumoto et al. |
| 2019/0199184 | A1 | | 6/2019 | Oshel et al. |
| 2020/0212771 | A1 | | 7/2020 | Metzger et al. |
| 2020/0313525 | A1 | | 10/2020 | Falkner et al. |
| 2021/0135552 | A1 | | 5/2021 | Vai et al. |
| 2021/0152064 | A1 | | 5/2021 | Ruggieri et al. |
| 2021/0351676 | A1 | | 11/2021 | Feidieker et al. |
| 2022/0258360 | A1 | * | 8/2022 | Dreher ............... H02K 15/0414 |

FOREIGN PATENT DOCUMENTS

| | | | |
|---|---|---|---|
| CN | 108886309 | A | 11/2018 |
| DE | 102017004538 | A1 | 11/2018 |
| DE | 102017123670 | A1 | 4/2019 |
| EP | 1375022 | A2 | 1/2024 |
| GB | 2072542 | A | 10/1981 |
| WO | 2013153594 | A1 | 10/2013 |
| WO | 2018206783 | A1 | 11/2013 |
| WO | 2018039806 | A2 | 3/2018 |
| WO | 2018233771 | A1 | 12/2018 |
| WO | 2018233774 | A1 | 12/2018 |
| WO | 2019084587 | A1 | 5/2019 |
| WO | 2019215514 | A1 | 11/2019 |

\* cited by examiner

GRIPPING APPARATUS FOR HAIRPINS

CROSS-REFERENCES TO RELATED APPLICATIONS

This application claims the benefit of the International patent application No. PCT/DE2020/100451 filed on May 28, 2020, and German patent application No. 10 2019 114 221.0 filed May 28, 2019, the entire disclosures of which are incorporated herein by way of reference.

FIELD OF THE INVENTION

The invention relates to a gripping apparatus for gripping at least one conductive member and to a method for gripping at least one conductive member by means of the gripping apparatus according to the invention.

BACKGROUND OF THE INVENTION

The gripping apparatus and the gripping method can be used, in particular, in a production of a component of an electric machine provided with coils. In particular, the gripping apparatus and the gripping method can be used in the production of a stator of an electric machine, wherein hairpins are inserted into grooves of a housing of the stator. In this case, the gripping apparatus and the method are suitable, in particular, for gripping conductive members, which may be configured as hairpins or electrical conductors, for stators or rotors of electric machines.

Electric machines are understood to be, in particular, machines for converting electric energy into kinetic energy and/or machines for converting kinetic energy into electric energy. In particular, this term is to be understood to mean electric motors and generators.

Hairpins are U-shaped electrical conductors that are inserted into electric machines. The electrical conductors are inserted from one side into a lamination stack of the electric machine. In one embodiment of a manufacturing method for a coil winding of a component of an electric machine, the electrical conductors, after insertion, are expanded, twisted, cut and then welded together on the opposite side. This results in closed electric circuits.

A coil winding for a component of an electric machine may be constructed from several so-called hairpin crowns. These are, for example, hairpins arranged in a ring shape which are joined already prior to insertion into the component for insertion. In embodiments of such a method, the crowns differ from each other in their respective diameters. For example, the crowns are divided into an outer crown, a middle crown and an inner crown. In turn, each crown may be formed from at least two layers of hairpins or hairpin limbs. Hairpin limbs refer to the two conductive member end portions, i.e., the ends or end regions of the hairpins. For example, the hairpins of a crown may have the one limb in the inner layer and the other in the outer layer in a lamination stack of a stator or/or rotor. They may also have both limbs in the same layer, i.e., in the outer or inner layer.

A coil winding of a component of an electric machine may be formed from several differently configured hairpins. In this case, the hairpins may differ with respect to several points. For example, the hairpins may differ with regard to a roof-shaped bent portion, a 3D bent portion and/or an offset bent portion. Among other things, the roof-shaped bend affects the spacing of the two limbs from each other, or the number of grooves of a component, such as, in particular, a stator and/or rotor, which are bridged from one limb to the other. Depending on which crown a hairpin is associated with, 3D bends in an end turn portion may differ from each other by a specific crown diameter. The offset bend defines which limb is disposed in which layer of the component. The combination of these three forming steps—the roof-shaped bend, the 3D bend and/or the offset bend—defines the geometry of the hairpin. These different hairpin geometries are to be gripped with a standardized gripping apparatus for further processing.

In one embodiment of a method for manufacturing the coil winding, after all forming steps have been carried out, all of the hairpins are gripped in a defined manner in an assembly machine for the following assembly. For example, pre-fitting the hairpins to form crowns may constitute a subsequent step. In order to be able to carry out a defined positioning process, it should be possible to grip the hairpin at both limbs.

In one embodiment of a method for manufacturing a component of an electric machine, the hairpins are fitted to form crowns in order then to form coils for the components therefrom, such as, in particular, a stator and/or a rotor. In this regard, for example,

[1] WO 2018/233774 A1 describes an apparatus for manufacturing a machine element provided with windings, such as a stator or a rotor, for an electric machine. The electric machine comprises at least one auxiliary device for providing pre-fitted hairpins that are aligned as in the machine element to be manufactured. The apparatus further includes an inserting device for removing the aligned hairpins from the auxiliary device and for introducing them into a machine element.

Also,

[2] WO 2018/233771 A1 deals with an apparatus for inserting electrical conductors into a machine element of an electric machine. For this purpose, the apparatus comprises a collection receptacle for providing an assembly of one or several crowns formed from electrically conductive hairpins, and an inserting device for removing the crown assembly from the collection receptacle and for introducing the crown assembly into the machine element.

From a technical standpoint, the very different geometries of the hairpins of a stator and/or rotor pose a challenge with regard to handling. Particularly if all gripping and handling processes are to be carried out with a single gripping apparatus. The many different limb positions of the hairpins render a gripping apparatus or a gripping system very complex and expensive.

SUMMARY OF THE INVENTION

Therefore, the invention has set itself an object of providing a gripping apparatus and a method for gripping at least one conductive member which can be carried out particularly easily, reliably, in particular with regard to the various limb positions of the hairpins, and inexpensively.

In order to achieve this object, the invention creates a gripping apparatus for gripping at least one conductive member, a method for gripping at least one conductive member, and a hairpin handling device for handling hairpins for manufacturing a coil winding of a component of an electric machine with the features of the independent patent claims. Advantageous embodiments of the invention are specified in the dependent patent claims.

According to one aspect thereof, the invention creates a gripping apparatus for gripping at least one conductive member of several conductive members, wherein the gripping apparatus is configured for gripping different geometries of conductive members, wherein the conductive member comprises a first conductive member end portion and a second conductive member end portion, comprising:

a basic body, a first gripping device comprising a first gripper, wherein the first gripping device is configured for gripping the first conductive member end portion or the second conductive member end portion of a predetermined conductive member by means of the first gripper, and a second gripping device comprising a second gripper disposed so as to be movable relative to the basic body, wherein the second gripping device is configured for moving the second gripper relative to the first gripper such that the second gripper grips the predetermined conductive member at the second conductive member end portion or at the first conductive member end portion.

Preferably, the first gripper is configured to be stationary relative to the basic body.

Preferably, the gripping apparatus is configured for gripping a coil member bent in a U-shape, particularly an electrically conductive pin, more particularly a hairpin.

Preferably, the first gripper and/or the first gripping device and/or a first arm member, on which the first gripper is disposed, is disposed so as to be movable relative to the basic body and/or relative to the second gripper.

Preferably, the first gripper and/or the first gripping device and/or a first arm member, on which the first gripper is disposed, are disposed so as to be linearly movable.

Preferably, the first gripper and/or the first gripping device and/or a first arm member is rotatably mounted, particularly about a pivot axle.

Preferably, the first gripper is rotatable about a center of the first conductive member end portion or second conductive member end portion to be gripped.

Preferably, the first gripper and the second gripper, with respect to their heights, particularly in a vertical direction of the gripping apparatus, are arranged with an offset relative to each other.

Preferably, the gripping apparatus comprises an, in particular first, moving unit configured for moving the first gripper and/or the first gripping device and/or a first arm member, on which the first gripper is disposed, relative to the basic body.

Preferably, the second gripping device comprises a moving unit configured for moving the second gripper relative to the basic body.

Preferably, the moving unit has a first gear and a second gear, on which the second gripper is disposed, wherein the first gear meshes with the second gear.

Preferably, the moving unit further includes a drive unit which is further preferably configured for driving the first gear to move the second gear.

Preferably, the second gripping device comprises an accommodating unit on which the second gear is disposed, wherein the accommodating unit comprises at least one accommodating portion, wherein the second gear has at least one guide member reaching into the accommodating portion, wherein the accommodating portion determines a trajectory of the second gripper.

Preferably, the accommodating portion has a circular-arc shape. Preferably, the guide member, during the movement of the second gear, is guided in such a way in the accommodating portion that the second gripper moves at least partially along a circular path.

Preferably, the accommodating portion is configured as a groove or elongated hole.

Preferably, the second gripping device or the gripping apparatus comprises an, in particular second, moving unit configured for moving the second gripper and/or a second arm member, on which the second gripper is disposed, relative to the basic body.

Preferably, the second gripping device comprises a moving unit configured for moving the second gripper and/or a second arm member, on which the second gripper is disposed, relative to the basic body along a circular path.

Preferably, the second gripper and/or a second arm member, on which the second gripper is disposed, is rotatably mounted particularly about a pivot axle, wherein the second gripping device comprises a moving unit configured for rotating the second gripper and/or the second arm member.

Preferably, the basic body comprises a base plate, wherein a first arm member and a second arm member are arranged on the base plate. Preferably, the two arm members extend vertically with respect to the base plate. Preferably, the first gripping device is disposed on the first arm member and the second gripping device on the second arm member.

Preferably, the first gripper and the second gripper each have two gripping jaws, wherein a respective gripping surface of the respective gripping jaws has a concave configuration.

Preferably, the first gripper has two gripping jaws, wherein one gripping jaw in each case comprises two gripping jaw members, wherein a first gripping jaw member of a first gripping jaw is associated with a first gripping jaw member of a second gripping jaw, and a second gripping jaw member of the first gripping jaw is associated with a second gripping jaw member of the second gripping jaw, wherein the first gripping jaw members and the second gripping jaw members are arranged opposite each other.

Preferably, the first gripper is configured as a double gripper.

Preferably, the basic body can be hinged to a transport device for moving the gripping apparatus.

According to another aspect, the invention relates to a hairpin handling device for handling hairpins for manufacturing a coil winding of a component of an electric machine, comprising a gripping apparatus according to any one of the preceding embodiments.

Preferably, the hairpin handling device comprises a transport device for moving the gripping apparatus as well as a control system.

According to another aspect, the invention relates to a method for gripping at least one conductive member by means of a gripping apparatus having a basic body, a first gripping device comprising a first gripper, and a second gripping device having a second gripper disposed so as to be movable relative to the basic body, comprising the steps:

gripping a first conductive member end portion or a second conductive member end portion of each predetermined conductive member by means of the first gripper of the first gripping device at a predetermined position;

moving the second gripper relative to the first gripper for adjustment to a position of the second conductive member end portion of the predetermined conductive member or of the first conductive member end portion of the predetermined conductive member, and gripping the second conductive member end portion of the conductive member or the first conductive member end portion of the conductive member by means of the second gripper.

In this case, the order of the method steps is, in principle, variable. In particular, the second gripper may be moved relative to the first gripper for adjustment to a position of a second conductive member end portion of the predetermined conductive member already prior to gripping the first conductive member end portion. Also, both conductive member end portions may be gripped simultaneously, particularly after first orientating the second gripper.

Preferably, the second gripper is moved along a predetermined circular path towards the second conductive member end portion or the first conductive member end portion in order to grip the second conductive member end portion of the predetermined conductive member or the first conductive member end portion of the predetermined conductive member.

Preferably, several conductive members are gripped one after the other in time with the gripping apparatus, wherein, prior to the gripping of the respective conductive member end portion, the conductive member is rotated about a limb axis of one of the two conductive member end portions, so that the other conductive member end portion is disposed on a circular path.

Particularly preferably, several conductive members are gripped one after the other in time with the gripping apparatus, wherein, prior to the gripping of the respective conductive member, the gripping apparatus is orientated relative to the conductive member to be respectively gripped and the second gripper is moved relative to the first gripper in such a way that the first and the second conductive member portion of the conductive member can be respectively gripped by the first and the second gripper at the same time.

In this case, the control system of the gripping apparatus, for example, obtains from a feeding device for feeding the conductive members to the gripping apparatus, for example, information on the specific geometry of a conductive member to be respectively gripped, e.g., the spacing between the two conductive member portions and its position on the feeding device. The control system then orientates the gripping apparatus relative to the conductive member to be gripped and positions the second gripper relative to the first gripper in such a way that then, the first conductive member portion can be gripped by the first gripper and, simultaneously, the second conductive member portion by the second gripper.

Preferably, subsequent to the gripping of the predetermined conductive member, the conductive member is pre-fitted, in particular into an adapter nest, by means of the gripping apparatus.

Preferably, several conductive members are pre-fitted one after the other in time to form a crown.

Preferably, for pre-fitting, the first gripping device and the second gripping device are positioned in such a way that the first gripper is disposed inside a circular path and the second gripper outside the circular path.

Preferably, for pre-fitting, the first gripping device and the second gripping device are positioned in such a way that the first gripper is disposed outside the circular path and the second gripper inside the circular path.

Preferably, for pre-fitting, the first gripping device and the second gripping device are positioned in such a way that the first gripper is disposed outside the circular path and the second gripper outside the circular path.

Preferably, for pre-fitting, the first gripping device and the second gripping device are positioned in such a way that the first gripper is disposed inside the circular path and the second gripper inside the circular path.

Embodiments of the invention relate to a gripping apparatus for gripping at least one conductive member of several conductive members, wherein the conductive members to be gripped have different geometries, wherein the conductive member comprises a first conductive member end portion and a second conductive member end portion. "Conductive member" refers to an electrical conductor or an electrically conductive element, preferably a hairpin, for example. In particular, "different geometries" means, in particular, that not all conductive members have the same configuration. In other words, limb spacings, for example, i.e., in particular the spacings between the conductive member end portions of the respective conductive members to be gripped may be different or dissimilar, i.e., vary. Among the several conductive members, individual conductive members may also have the same or identical configuration. In particular, the "conductive member end portion" may be a limb of a hairpin. The "conductive member end portion" preferably is an end region or an end or an end portion or a conductor end of the at least one conductive member. In particular, a common point of attachment may be taken as a basis for gripping the two conductive member end portion of the at least one conductive member. In particular, "gripping" may include taking and/or holding and/or picking up the at least one conductive member.

Preferably, the gripping apparatus is configured for gripping a coil member bent in a U-shape, particularly an electrically conductive pin, preferably a hairpin. The at least one conductive member preferably has a 3-dimensional shape or 3D shape. In particular, the at least one conductive member is configured with a U-shaped bend. The at least one conductive member may have several angles resulting in a roof shape, which is also referred to as a house roof shape. In this case, the angles and the limb lengths of the conductive member may vary depending on the required shape. In its roof-shaped region, the at least one conductive member is preferably bent in a direction extending perpendicularly to the plane of the conductive member, so that a curvature is formed in the roof-shaped region.

The gripping apparatus comprises a basic body, a first gripping device and a second gripping device. The first gripping device has a first gripper. In particular, the "basic body" may be a frame or support. A "gripper" may be a device which is composed, in particular, of at least two movable jaws or gripping jaws and with which an element or component or workpiece may be picked up and brought or moved to another location or position or place. The first gripping device is configured for gripping the first conductive member end portion or the second conductive member end portion of a predetermined conductive member by means of the first gripper. Preferably, the first gripping device may pick up a predetermined conductive member, in particular at a gripping position or gripping point predetermined for the first gripper, at the first conductive member end portion or the second conductive member end portion. The second gripping device comprises a second gripper disposed so as to be movable relative to the basic body or the first gripping device. In other words, the second gripper is movably mounted. In other words, the second gripper can be moved relative to the basic body or the first gripping device. In particular, the basic body remains stationary in the process, i.e., does not move. Further, the second gripping device is configured for moving the second gripper relative to the first gripper such that the second gripper grips the predetermined conductive member at the second conductive member end portion or at the first conductive member end portion. Preferably, the second gripper can be driven or moved towards the second conductive member end portion or the first conductive member end portion and grip or pick up the second conductive member end portion or the first conductive member end portion, particularly at a gripping position or gripping point predetermined for the second gripper. In other words, the second gripper in particular drives towards the predetermined gripping point in order to be able to grip in a defined manner the second conductive member end portion or the first conductive member end portion. Particularly preferably, the second gripper is configured for driving towards different positions of the second conductive member end portions or different limb positions of the conductive members.

The gripper, which is preferably stationary relative to the basic body, may be driven, for example together with the basic body, towards a defined pick-up position, to which the first conductive member portions of all conductors to be gripped are delivered. Depending on the different relative position of the conductor member portions, the position of the second gripper may be adjusted relative to the first gripper. Thus, the gripping apparatus may be adapted in a simple manner to different hairpins, for example, wherein the hairpins can always be exactly positioned.

In particular, the movable second gripper yields the advantage that it is possible to move towards the respective conductive member end portion of the at least one conductive member. Thus, the respective conductive members can be gripped in a particularly simple and reliable manner. Moreover, rapid gripping movements can be performed by the gripping apparatus without resulting in vibrations of the conductive members, because the conductive members are gripped in a defined manner. Moreover, it is possible for an actuator—the second gripper—to drive towards the different limb positions, whereby the gripping apparatus is constructed in a particularly compact and/or cost-effective manner.

An advantageous embodiment provides that the first gripper is configured to be stationary relative to the basic body. In other words, the first gripper does not move relative to the basic body. In other words, the first gripper is configured to be non-movable. In particular, the first gripper can be non-movably arranged on the basic body. Accordingly, only the second gripper can move relative to the basic body, but not the first gripper. In particular, the first gripper may remain in its position during a gripping process, i.e., the gripping of the at least one conductive member, while the second gripper is being moved. Due to the movable configuration of one of the two grippers, the structure of the gripping apparatus has a particularly compact and simple design.

Alternatively, the first gripper and/or a first arm member, on which the first gripper is disposed, and/or the first gripping device can be disposed so as to be movable relative to the basic body and/or relative to the second gripper. In other words, the first gripper and/or a first arm member, on which the first gripper is disposed, and/or the first gripping device are movably mounted. In other words, the first gripper can be moved relative to the basic body or the second gripping device. In particular, the basic body remains stationary in the process, i.e., does not move. Further, the first gripping device is preferably configured for moving the first gripper relative to the second gripper such that the first gripper grips the predetermined conductive member at the first conductive member end portion or at the second conductive member end portion. Preferably, the first gripper can be driven or moved towards the first or second conductive member end portion and grip or pick up the first or second conductive member end portion, particularly at a gripping position or gripping point predetermined for the first gripper. In other words, the first gripper in particular drives towards the predetermined gripping point in order to be able to grip in a defined manner the first or second conductive member end portion. Particularly preferably, the first gripper is configured for driving towards different positions of the first or second conductive member end portions or different limb positions of the conductive members.

Particularly preferably, the first gripper and/or a first arm member, on which the first gripper is disposed, and/or the first gripping device are disposed so as to be linearly movable. In other words, the first gripper and/or a first arm member, on which the first gripper is disposed, and/or the first gripping device are configured for carrying out a linear movement. For moving the first gripper and/or the first arm member, the gripping apparatus preferably has a first moving unit. The first moving unit is configured for moving the first gripper and/or the first arm member relative to the basic body and/or the second gripper. In other words, the first gripper and/or the first arm member can be moved by means of the first moving unit.

Advantageously, the gripping apparatus comprises a first moving unit configured for moving the first gripper and/or a first arm member, on which the first gripper is disposed, relative to the basic body and/or the second gripper. In other words, the first gripper and/or the first arm member, on which the first gripper is disposed, of the first gripping device can be moved by means of the first moving unit. In addition or as an alternative, the first moving unit can be configured for rotating the first gripper and/or the first arm member, on which the first gripper is disposed, in particular about a pivot axle of the first gripping device. Particularly preferably, the first arm member, which may also be referred to as the first gripper arm or gripping arm of the first gripping device, has a pivot axle, particularly in a lower region. In other words, a gripper arm or first arm member of the gripping apparatus has a pivot axle, in particular in a lower region or end region, preferably opposite the base plate. In particular, the first gripper is arranged at an end of the first arm member. In particular, the pivot axle makes it possible to grip different geometries of hairpins, particularly preferably different limb spacings, with the gripping apparatus.

In addition or as an alternative, it may be provided that the first gripper is rotatable about a center of the first or second conductive member end portion to be gripped. In other words, the first gripper or the first gripping device or the first gripping arm can rotate about a limb center of the first or second conductive member end portion, i.e., limb of the conductive member, to be gripped.

Advantageously, the second gripping device comprises a moving unit configured for moving the second gripper relative to the basic body. In other words, the second gripper of the second gripping device can be moved by means of the moving unit. Preferably, the moving unit has a first gear and a second gear, wherein the second gripper is disposed on the second gear. In this case, the first gear meshes with the second gear. Preferably, the first gear is the driven gear, which may also be referred to as the drive wheel. Particularly preferably, the first gear is configured as an externally toothed gear. The second gear is, in particular, an output wheel or gear, which may also be configured as an output plate. Particularly preferably, the second gear is configured as an internally toothed gear. The moving unit further includes a drive unit which is configured for driving the first gear to move the second gear. Preferably, the first gear is moved or rotated or driven by the drive unit. The drive unit may be configured as a motor, in particular a stepping motor. The drive unit rotates or moves the first gear, which meshes with the second gear and thus moves the second gear. Particularly preferably, the teeth of the first gear mesh with a section of the second gear. By implementing the moving unit using two gears, the mechanism for moving the second gripper has a particularly simple and rugged structure.

According to an advantageous refinement, it is provided that the second gripping device comprises an accommodating unit on which the second gear is arranged. The accommodating unit may be configured as a support, such as a plate, for example. In particular, the accommodating unit is configured for accommodating or holding or fixing or supporting the second gear. Further, the accommodating unit comprises at least one accommodating portion, wherein the second gear has at least one guide member reaching into the accommodating portion. In other words, an element or component or appendage, which is disposed in the accommodating portion of the accommodating unit, may be disposed on the second gear. In particular, "accommodating portion" refers to a region or portion or accommodating means or section of the accommodating unit. In particular, the at least one guide member extends perpendicularly to a surface of the second gear. The second gear may also have several guide members. Moreover, the accommodating portion determines a trajectory of the second gripper. In other words, the movement of the second gripper can be limited or determined by arranging the guide member of the second gear in the accommodating portion of the accommodating unit. In other words, the second gear or the second gripper is guided by the accommodating section or the guide member in the accommodating portion. By means of the cooperation of the accommodating portion with the guide member, a movement or guidance of the second gripper can be set or determined in a particularly simple and reliable manner.

Advantageously, the accommodating portion has a circular-arc shape, wherein the guide member, during the movement of the second gear, is guided in such a way in the accommodating portion that the second gripper moves at least partially along a circular path. In particular, "circular path" refers to a circle line along which the second gripper is at least partially moved. In other words, the at least one guide member guides the second gear on a defined diameter in the accommodating section.

Particularly preferably, the accommodating portion is configured as a groove or elongated hole or furrow or channel. In particular, the groove or elongated hole or furrow or channel has a circular-arc shape. The at least one guide member may preferably be configured as an appendage or pin or stud or bolt. In this case, the guide member is disposed at least partially, i.e., completely or partially, in the groove or elongated hole or furrow or channel. When the second gear moves, the second gear can only move within the groove or elongated hole or furrow or channel, due to the guide member being disposed in the groove or elongated hole or furrow or channel. In particular, a width of the at least one guide member is adapted to a width of the accommodating portion. When the at least one guide member is guided in the accommodating portion, the at least one guide member is preferably guided along a length of the accommodating portion. This results in the advantage that the second gripper is guided without any unwanted movement, such as wobbling.

In addition or as an alternative, the second moving unit can be configured for rotating the second gripper and/or a second arm member, on which the second gripper is disposed, in particular about a pivot axle of the second gripping device. Particularly preferably, a gripper arm or second arm member of the gripping apparatus has a pivot axle, in particular in a lower region or end region, preferably opposite the base plate. In particular, the second gripper is arranged at an end of the second arm member. In particular, the pivot axle makes it possible to grip different geometries of hairpins, particularly preferably different limb spacings, with the gripping apparatus.

Advantageously, the first gripper and the second gripper, with respect to their heights, are arranged with an offset relative to each other. In other words, the first gripper and the second gripper can be arranged differently or with an offset relative to each other in the vertical direction of the gripping apparatus. Preferably, the first gripper and the second gripper are not arranged at the same height.

Another advantageous embodiment provides that the basic body comprises a base plate, wherein a first arm member and a second arm member are arranged on the base plate, wherein the two arm members extend vertically with respect to the base plate, wherein the first gripping device is disposed on the first aim member and the second gripping device on the second aim member. In particular, the term "base plate" refers to a plate-shaped workpiece. In this case, the first arm member is disposed at an end or end portion on a surface of the base plate, and the second arm member at an opposite end or end portion on the surface of the base plate, in particular parallel to the first arm member, on the base plate. In other words, the first arm member and the second aim member are disposed or fixed with a predetermined spacing, in particular parallel to each other, on the base plate. The first arm member and the second arm member may be configured, for example, as a bar or rail or rod. In particular, the first arm member and the second arm member extend perpendicularly to a surface or side of the base plate.

Advantageously, the first gripper and the second gripper each have two gripping jaws, wherein a respective gripping surface of the respective gripping jaws has a concave configuration. In other words, the respective gripping surfaces of the gripping jaw may be configured to be round, in particular curved inward. For example, the first gripper and/or the second gripper are configured as parallel grippers. Preferably, a shape of the gripping jaws or gripping surfaces may also be adapted to a shape of the conductive member, in particular of the conductive member end portion. Due to the round configuration of the gripping jaws, the conductive member or the respective conductive member end portion can be securely and reliably held between the gripping jaws.

In particular, the first gripper and/or the second gripper close and clamp the conductive member between their gripping jaws, which may also be referred to as clamping jaws. Thus, the conductive member is held, in particular, at its two spaced-apart conductive member end portions or at one conductive member end portion.

Another advantageous embodiment provides that the basic body can be hinged to a transport device for moving the gripping apparatus. The transport device may be a robot, for example. In other words, the basic body or the gripping apparatus may be installed on a robot, for example.

The invention also includes a hairpin handling device for handling hairpins for manufacturing a coil winding of a component of an electric machine, which comprises the gripping apparatus according to the invention and/or a transport device for moving the gripping apparatus. The invention also includes a control system of the hairpin handling device and/or of the gripping apparatus and/or of the transport device. According to another aspect of the invention, a computer program is provided which includes program steps for controlling the gripping apparatus according to the invention and/or program steps for controlling a method according to the invention and/or program steps for controlling a hairpin handling device according to the invention and/or program steps for controlling a transport device according to the invention for moving the gripping apparatus.

Finally, the invention also includes a method for gripping at least one conductive member by means of a gripping apparatus, wherein the gripping apparatus includes a basic body, a first gripping device comprising a first gripper, and a second gripping device having a second gripper disposed so as to be movable relative to the basic body. In one method step in the method, a first conductive member end portion or a second conductive member end portion of each predetermined conductive member is gripped by means of the first gripper of the first gripping device at a predetermined position. In other words, in one method step, a respective conductive member may be gripped individually, by the first gripper, at the first conductive member end portion or the second conductive member end portion. In another method step, the second gripper is moved relative to the first gripper or the basic body for adjustment to a position of the second conductive member end portion of the predetermined conductive member or of the first conductive member end portion of the predetermined conductive member. Moreover, the second conductive member end portion of the conductive member or the first conductive member end portion of the conductive member are gripped by means of the second gripper.

In this case, the order of the method steps is, in principle, variable. In particular, the second gripper may be moved relative to the first gripper for adjustment to a position of a second conductive member end portion of the predetermined conductive member already prior to gripping the first conductive member end portion. Also, both conductive member end portions may be gripped simultaneously, particularly after first orientating the second gripper.

In this case, the control system of the gripping apparatus, for example, can obtain from a feeding device for feeding the conductive members to the gripping apparatus, for example, information on the specific geometry of a conductive member to be respectively gripped, e.g., the spacing between the two conductive member portions and its position on the feeding device. The control system then orientates the gripping apparatus relative to the conductive member to be gripped and positions the second gripper relative to the first gripper in such a way that then, the first conductive member portion can be gripped by the first gripper and, simultaneously, the second conductive member portion by the second gripper.

An advantageous embodiment provides that the second gripper is moved along a predetermined circular path towards the second conductive member end portion or the first conductive member end portion in order to grip the second conductive member end portion or the first conductive member end portion of the predetermined conductive member. In other words, the second gripper is guided on a defined diameter.

Another advantageous embodiment provides that the conductive members are gripped one after the other in time with the gripping apparatus, wherein, prior to the gripping of the respective conductive member end portion, the conductive member is rotated about a limb axis of one of the two conductive member end portions of the conductive member, so that the other conductive member end portion is disposed on a circular path. In particular, "limb axis" refers to an axis about which the respective conductive member is turned or rotated. In particular, one of the two conductive member end portions has the limb axis. Particularly preferably, the conductive member end portions or limbs of the conductive members are successively, in particular in time, placed congruently one above the other, and then all conductive members, in particular individually, are rotated about an, in particular identical, limb axis of one of the two conductive member end portions or limbs, so that the result is a common diameter at the other conductive member end portions or limbs. In other words, all conductive members to be gripped are preferably rotated about the, in particular identical, limb axis so that the conductive member are orientated in such a way that their other limb, about which the conductive member is, in particular, not rotated, are located on a common diameter or a common circular path or circle line or circle radius. Preferably, the respective conductive members are rotated about a limb axis of the first conductive member end portion, so that the second conductive member end portions or limbs are arranged or situated on a common circle line.

In a particularly preferred embodiment, several conductive members are gripped one after the other in time with the gripping apparatus, wherein, prior to the gripping of the respective conductive member, the gripping apparatus is orientated relative to the conductive member to be respectively gripped and the second gripper is moved relative to the first gripper in such a way that the first and the second conductive member portion of the conductive member can be respectively gripped by the first and the second gripper at the same time.

In this case, the control system of the gripping apparatus, for example, obtains from a feeding device for feeding the conductive members to the gripping apparatus, for example, information on the specific geometry of a conductive member to be respectively gripped, e.g., the spacing between the two conductive member portions and its position on the feeding device. The control system then orientates the gripping apparatus relative to the conductive member to be gripped and positions the second gripper relative to the first gripper in such a way that then, the first conductive member portion can be gripped by the first gripper and, simultaneously, the second conductive member portion by the second gripper.

Advantageously, subsequent to the gripping of the predetermined conductive member, the conductive member is pre-fitted, in particular into an adapter nest, by means of the gripping apparatus. The adapter nest may also be referred to as a pre-fitting nest. Particularly preferably, several conductive members are pre-fitted one after the other in time to form a crown.

Advantageously, the first gripping device and the second gripping device, for pre-fitting, are positioned so that the first gripper is disposed inside a circular path of the assembly and the second gripper outside the circular path, or the first gripper is disposed outside the circular path and the second gripper inside the circular path, or the first gripper is disposed outside the circular path and the second gripper outside the circular path, or the first gripper is disposed inside the circular path and the second gripper inside the circular path.

Embodiments of the invention also include refinements of the gripping apparatus, of the hairpin handling device, of the transport device according to the invention and of the method according to the invention, which comprise features as they were already described in connection with the refinements of the gripping apparatus according to the invention and the method according to the invention. For this reason, the respective refinements of the hairpin handling device according to the invention, of the transport device according to the invention and of the method according to the invention are not described again herein.

BRIEF DESCRIPTION OF THE DRAWINGS

An exemplary embodiment will be explained in more detail below with reference to the attached drawings. In the drawings.

DETAILED DESCRIPTION OF THE PREFERRED EMBODIMENTS

The exemplary embodiments explained below are preferred embodiments of the invention. In the exemplary embodiments, the described components of the embodiments each constitute individual features of the invention, which are to be considered independently of each other and which also develop the invention independently from each other in each case, and are thus to be deemed constituent elements of the invention individually or in a combination other than that which is shown. Moreover, the described embodiments can also be supplemented with further features of the invention already described.

Figure 1A:
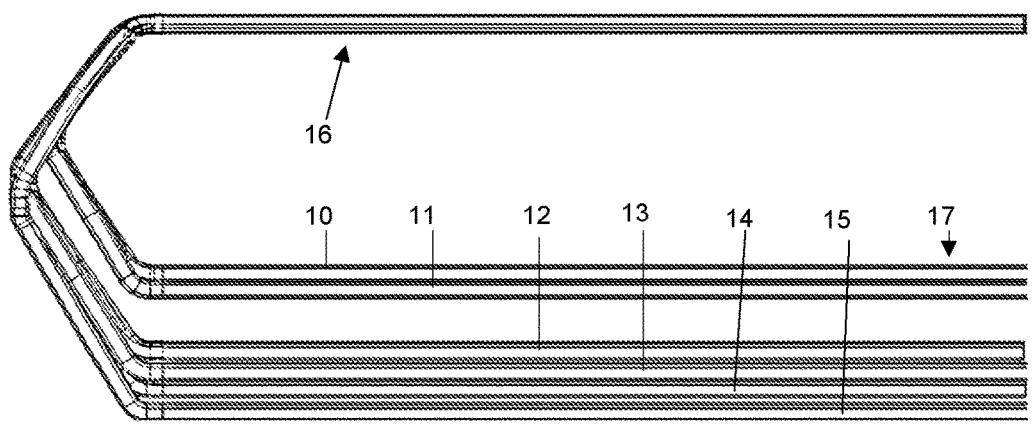
FIG. 1a shows a schematic representation of an assembly of several conductive members of a stator with two crowns in a side view.
Figure 1B:
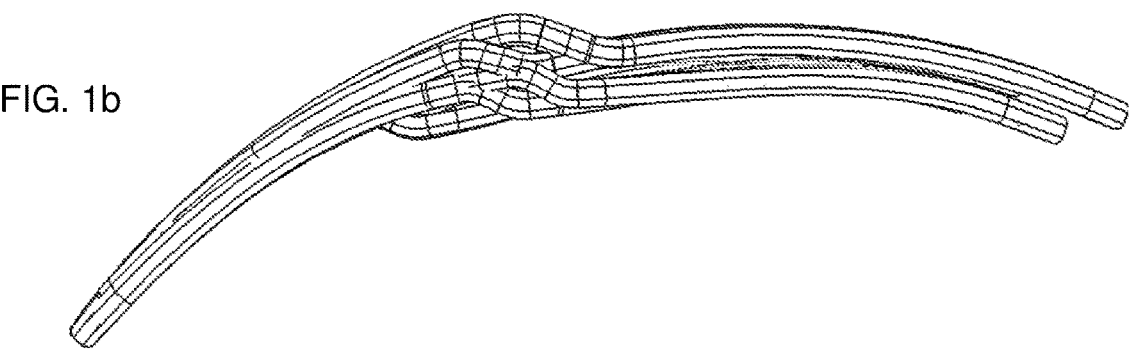
FIG. 1b shows a schematic representation of an assembly of several conductive members of a stator with two crowns in a top view.
Figure 1C:
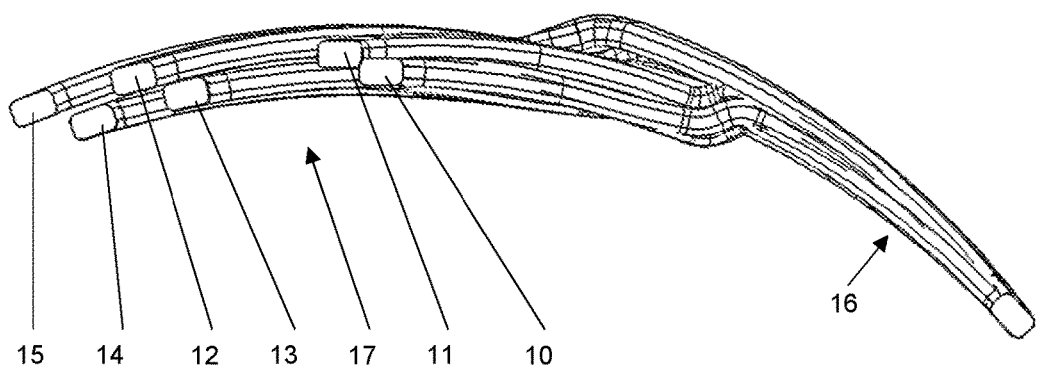
FIG. 1c shows a schematic representation of an assembly of several conductive members of a stator with two crowns in a view from below.
Figure 2A:
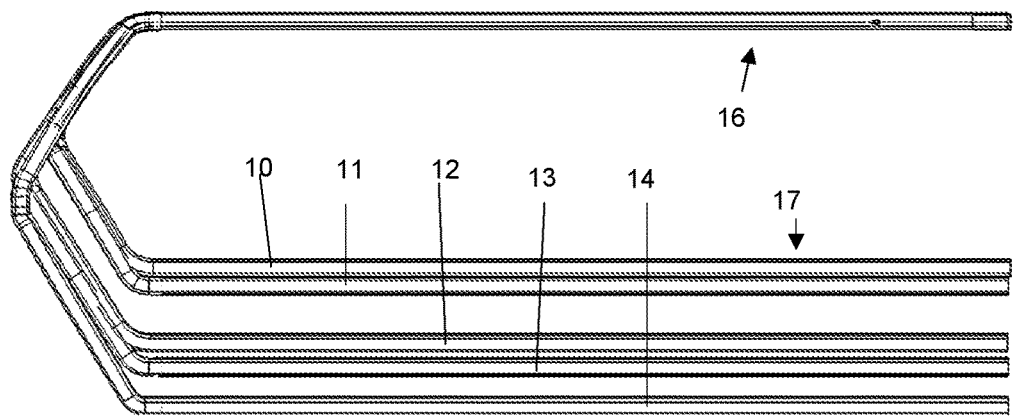
FIG. 2a shows a schematic representation of another assembly of several conductive members of a stator with two crowns in a side view.
Figure 2B:
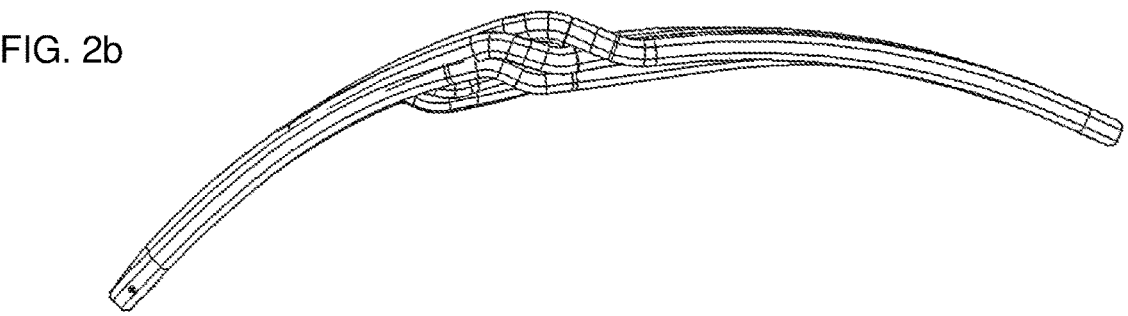
FIG. 2b shows a schematic representation of another assembly of several conductive members of a stator with two crowns in a top view.
Figure 2C:
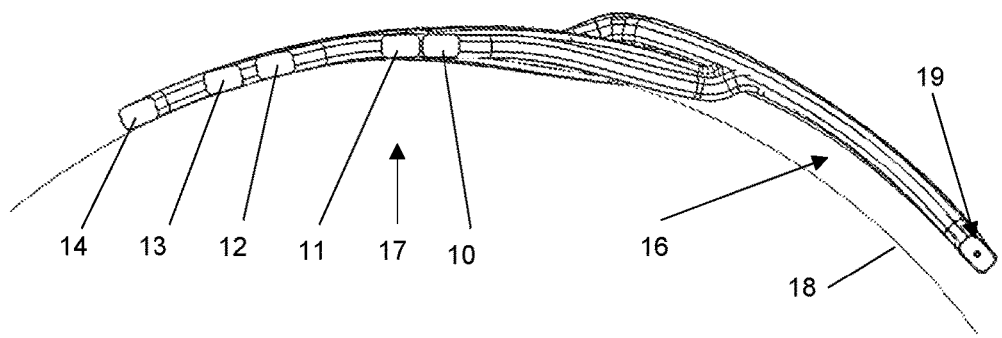
FIG. 2c shows a schematic representation of another assembly of several conductive members of a stator with two crowns in a view from below.

FIGS. 1a to 1c and 2a to 2c depict several conductive members, particularly for a stator of an electric machine, in different views—in a side view, a top view and from below. The conductive members are configured as electrical conductors, particularly as hairpins. FIGS. 1a to 1c show six conductive members—a first conductive member 10, a second conductive member 11, a third conductive member 12, a fourth conductive member 13, a fifth conductive member 14 and a sixth conductive member 15—and FIGS. 2a to 2c show five conductive members—the first through fifth conductive member 10 through 14. Though the respective conductive members are shown together in the FIGS. 1a to 1c and 2a to 2c in order to illustrate the different configurations of the conductive members, for gripping, however, the individual conductive members are successively, particularly successively in time, disposed on the predefined or predetermined position and there are individually gripped by a gripping apparatus. After they have been manufactured in a manufacturing device and/or bending device, the individual conductive members are individually provided to the gripping apparatus via a transport system and then gripped individually.

The shape of the individual conductive members is to be addressed in more detail below. The conductive members have a 3-dimensional shape or 3D shape. The conductive members are configured with a U-shaped bend. The conductive members have several angles resulting in a roof shape, which is also referred to as a house roof shape. In this case, the angles and the limb lengths of the conductive member may vary depending on the required shape. In their roof-shaped regions, the conductive members are preferably bent in a direction extending perpendicularly to the plane of the conductive member, so that a curvature is formed in the roof-shaped region. With respect to further details regarding the shape of the respective conductive members, reference is made here to WO 2018/233774 A1.

The respective conductive members have two conductive member end portions—a first conductive member end portion 16 and a second conductive member end portion 17. The conductive member end portion may also be referred to as a limb end. In FIGS. 1a to 1c and 2a to 2c, the respective conductive members have a rectangular cross-section or rectangular cross-sectional shape. Alternatively, the conductive members may also have a round or oval or square or polygonal cross-section.

Though FIGS. 1a to 1c and 2a to 2c show several conductive members at the same time, the illustrations in FIGS. 1a to 1c and 2a to 2c are supposed to show how the individual conductive members are disposed one after the other, in particular in time, for gripping with a gripping apparatus. The depicted conductive members are shown to be placed one above the other in a congruent manner at one of the two conductive member end portions, in this case the first conductive member end portion 16, in order to illustrate the identical pick-up position for the first conductive member end portions 16. The other conductive member end portions, in this case the second conductive member end portions 17, have positions that are different from each other. Comparing FIGS. 1a to 1c with FIGS. 2a to 2c, the second conductive member end portions 17 in FIGS. 2a to 2c are disposed on a circle line 18, in particular side-by-side. Six positions are apparent in FIGS. 1a to 1c, in particular gripping positions that deviate from one another both in the x- and the y-direction.

In order to obtain such an arrangement of the second conductive member end portions 17 as it is shown in FIGS. 2a to 2c, the respective conductive members are rotated about a limb axis 19, in particular of the first conductive member end portion 16. In particular, "limb axis" refers to an axis about which the respective conductive member is turned or rotated. In particular, one of the two conductive member end portions has the limb axis. In the process, the first conductive member end portions 16 of the respective conductive members are successively, in particular in time, placed congruently one above the other, and then individually rotated about the limb axis 19 of the first conductive member end portion 16, so that the result is a common diameter at the second conductive member end portions 17, or the second conductive member end portions 17 are located on a common circular path or circle line or radius. In the practical application, by moving the transport device, e.g., a robot, to which the gripping apparatus 20 is attached, the gripping apparatus 20 is positioned, relative to the conductive members to be gripped, in such a way that the second conductive member end portions 17 are located on a common circular path or circle line or radius relative to the gripping apparatus 20.

The orientation of the respective conductive members as shown in FIGS. 2a to 2c forms the starting point for gripping the respective conductive members for the gripping apparatus, which will be addressed in detail below.

Figure 3:
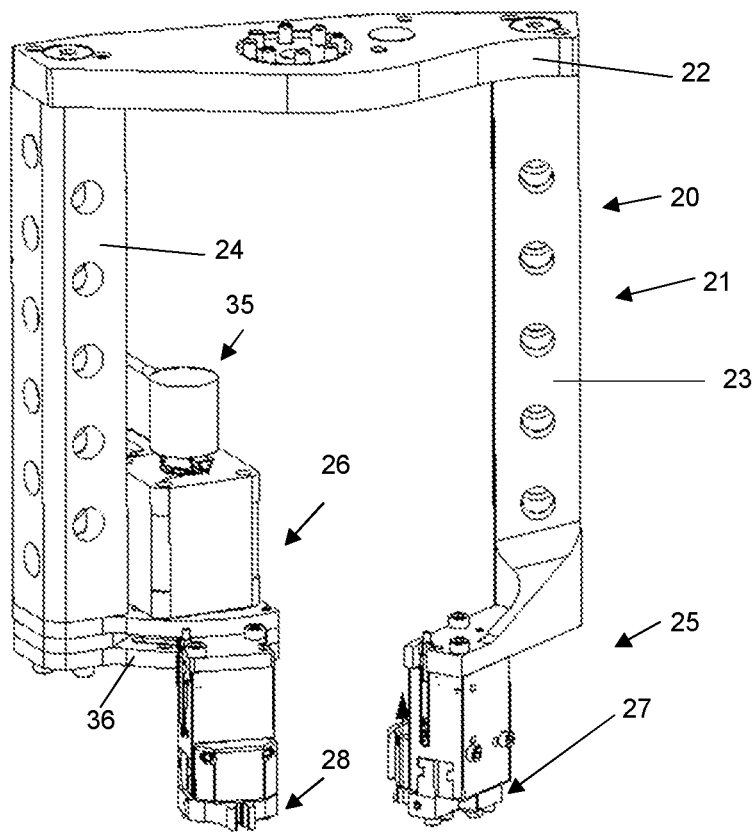
FIG. 3 shows a schematic representation of a gripping apparatus with a basic body, a first gripping device comprising a first gripper, and a second gripping device comprising a second gripper and a moving unit for moving the second gripper, in a perspective view.
Figure 4:
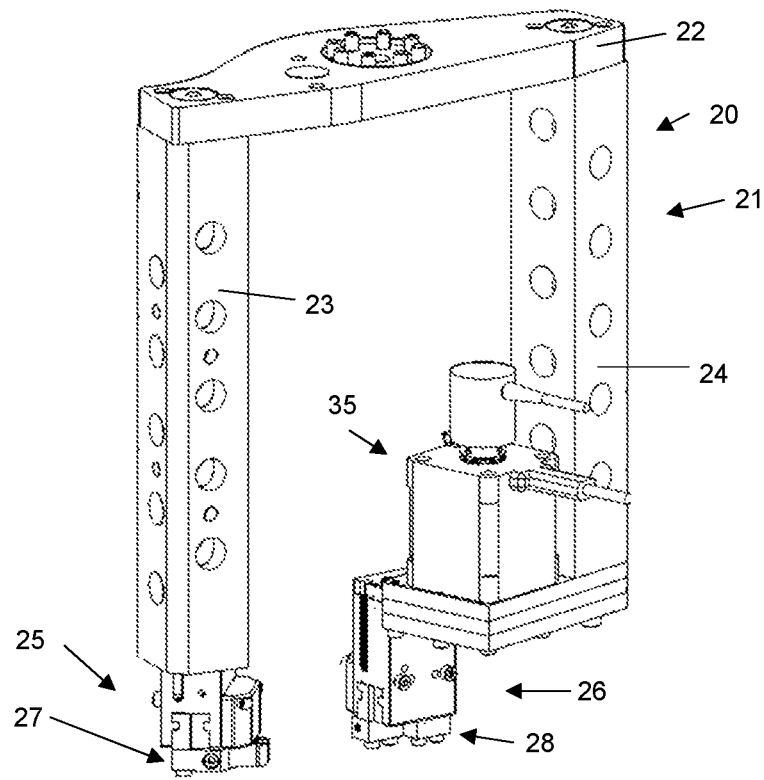
FIG. 4 shows a schematic representation of the gripping apparatus with the basic body, the first gripping device comprising the first gripper, and the second gripping device comprising the second gripper and the moving unit for moving the second gripper, in another perspective view.

The gripping apparatus 20 for gripping the individual conductive members is shown in a perspective view in FIGS. 3 and 4. The gripping apparatus 20 may be installed on a robot, for example. The gripping apparatus 20 comprises a basic body 21 having a base plate 22, a first arm member 23 and a second arm member 24. The gripping apparatus 20 further comprises a first gripping device 25 and a second gripping device 26. The base plate 22 is configured as a plate-shaped workpiece or as a plate. The first arm member 23 is disposed on the base plate 22, on a surface at an end portion of the base plate 22, and the second arm member 24 is disposed at an opposite end portion on the surface of the base plate 22. In other words, the first arm member 23 and the second arm member 24 are disposed opposite each other, in particular parallel to each other, on the base plate 22. In this case, the first arm member 23 and the second arm member 24 are fixed to the base plate, in particular screw-connected therewith or connected therewith positively or by substance-to-substance connection. Here, the two arm members—the first arm member 23 and the second arm member 24—extend perpendicularly or vertically to the base plate 22. The two aim members 23, 24 may be configured, for example, as a bar or rod or rail.

The first gripping device 25 is disposed on or fixed to the first arm member 23. In other words, the first arm member 23 holds or supports the first gripping device. In this case, the first arm member 23 is disposed on or attached to the base plate 22 with one end. The first gripping device 25 is arranged on an end of the first arm member 23 opposite the one end, or opposite the base plate 22. In other words, the first arm member 23 is disposed between the base plate 22 and the first gripping device 25. Furthermore, the second arm member 24 is disposed on or attached to the base plate 22 with one end. The second gripping device 26 is arranged on or attached to an end of the second arm member 24 opposite the one end, or opposite the base plate 22. In other words, the second aim member 24 is disposed between the base plate 22 and the second gripping device 24. In other words, the gripping apparatus 20 includes the base plate 22, to which two arms or arm members 23, 24 are screwed. A gripping device 25, 26, each of which is supposed to grip one of the two conductive member end portions 16, 17, is installed on each of these arms.

Figure 5:
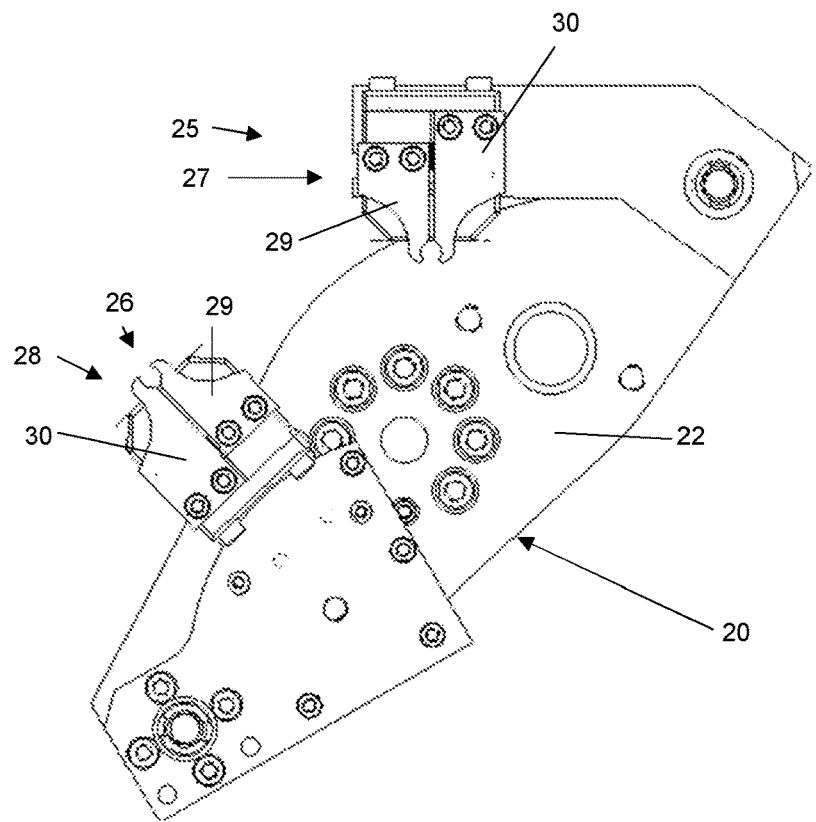
FIG. 5 shows a schematic representation of the gripping apparatus of FIG. 4 in a view from below.

FIG. 5 shows the gripping apparatus 20 in a perspective view from below. As is apparent from FIG. 5, the first gripping device 25 has a first gripper 27, and the second gripping device 26 has a second gripper 28. One of the two grippers is shown in more detail in FIG. 6. The two grippers—first gripper 27 and second gripper 28—each have two gripping jaws—a first gripping jaw 29 and a second gripping jaw 30. Preferably, the two gripping jaws 29, 30 of the first gripper 27 and the second gripper 28 have an analogous or identical structure. Both gripping jaws 29, 30 have one gripping surface 31 each. In this case, the gripping surface 31 of the gripping jaw 29, 30 is curved inward or configured to be concave. The first gripping device 27 is configured for gripping, in particular with its gripping jaws, the conductive member at the first conductive member end portion 16. The second gripper 28 is configured for gripping, in particular with its gripping jaws, the conductive member at the second conductive member end portion 17. In this case, the gripping surface 31 of the respective grippers 27, 28 grasps the conductive member end portion. For example, the first gripper 27 and/or the second gripper 28 are configured as parallel grippers.

Moreover, the first gripper 27 or the first gripping device 25 are configured in a stationary manner. In this case, the first gripper 27 is attached to the first arm member 23. The second gripper 28 is configured to be movable. In order to move the second gripper 28, the second gripping device 26 comprises a moving unit 32. The second gripper 27 is movable relative to the base plate 22 or the basic body 21 and/or the first gripper 27 or the first gripping device 25. The moving unit 32 for moving the second gripper 28 is to be explained in more detail in connection with FIGS. 7 and 8.

Figure 7:
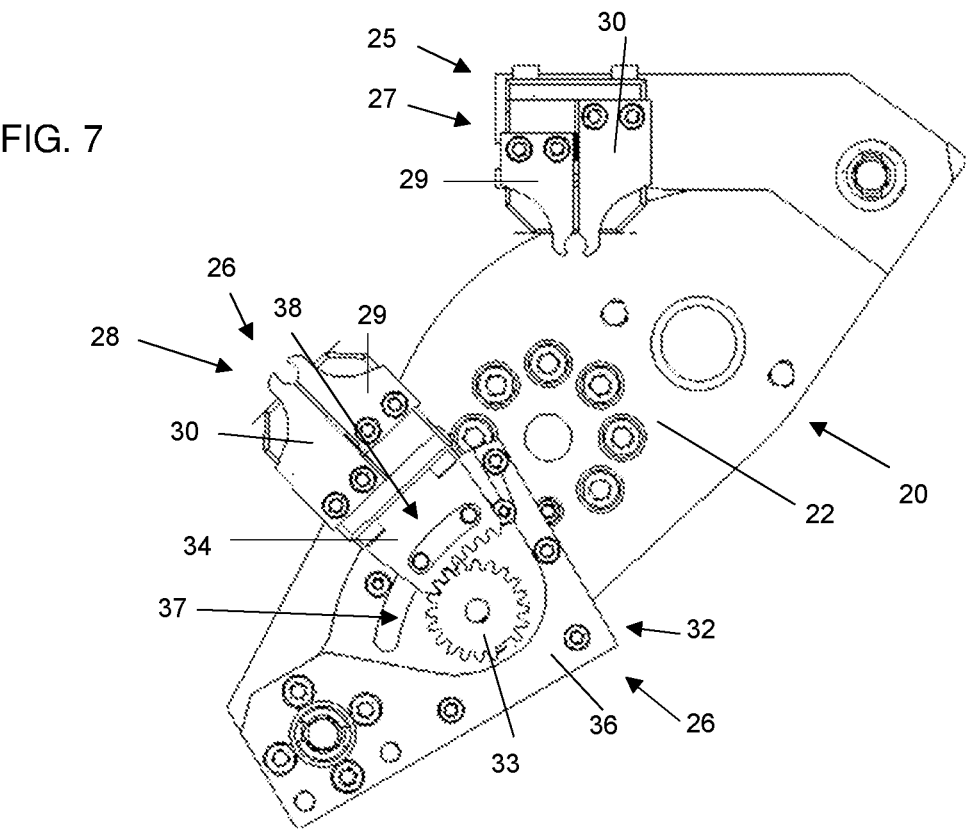
FIG. 7 shows a schematic representation of the gripping apparatus of FIG. 4 in a view from below, with a moving unit being visible.
Figure 8:
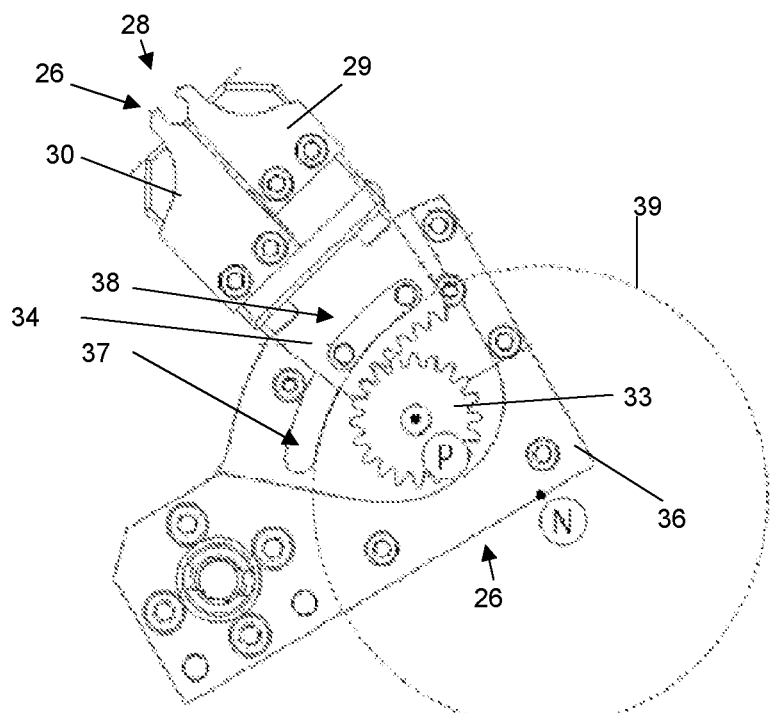
FIG. 8 shows a schematic representation of the second gripper with a visible moving unit, which comprises a first gear and a second gear.

The moving unit 32 has a first gear 33, a second gear 34 and a drive unit 35 (not shown in FIGS. 7 and 8). The first gear 33 is configured as an externally toothed gear. The second gear 34 is configured as an internally toothed gear. In this case, the first gear meshes 33 with the second gear 34. The first gear 33 is driven by the drive unit 35. Thus, the drive unit 35 is configured for driving the first gear 33, i.e., cause it to execute a rotary movement. The drive unit 35 may be a stepping motor, for example. The first gear 33 may also be referred to as a drive wheel or drive gear. The second gear 34 is driven, i.e., caused to move, by the first gear 33. Thus, the second gear 34 may also be referred to as the output gear or output wheel or output plate. As is apparent from FIGS. 7 and 8, the second gear 34 does not have a round or wheel-shaped shape, but constitutes a toothed segment. The second gear 34 is configured as a plate-shaped workpiece or a toothed plate, with which the teeth of the first gear 33 mesh. Moreover, the second gripper 28 is arranged on or attached to the second gear 34. Therefore, the second gripper 28 is automatically moved along due to the movement of the second gear 34.

Furthermore, the second gripping device 26 comprises an accommodating unit 36 on which the second gear 34 is arranged or mounted. The accommodating unit 36 may be configured as a support. The accommodating unit 36 is configured as a plate-shaped component or as a plate. Further, the accommodating unit 36 comprises at least one accommodating portion 37. The accommodating unit 36 may also have several accommodating portions. The accommodating portion 37 is configured as a groove or elongated hole or furrow or channel. The accommodating portion 37 has a circle line-shaped or rounded or semi-circular shape. Moreover, the second gear 34 has at least one guide member 38. In other words, at least one guide member 38 is disposed on the second gear 34. Also, several guide members may be disposed on the second gear 34. The guide member may 38 be configured as a pin or bolt or appendage, for instance. In this case, the at least one guide member 38 reaches into the accommodating portion 37. In other words, the guide member is disposed at least partially, i.e., completely or partially, in the accommodating portion 37. A trajectory is defined for the second gripper 28 by the guide member 38 arranged in the accommodating portion 37.

During the movement of the second gear 34, the guide member 38 is guided in such a way in the accommodating portion 37 that the second gripper moves 28 at least partially along a circular path 39. In particular, "circular path" refers to a circle line along which the second gripper is at least partially moved.

A specific exemplary embodiment shall be described below:

The mechanism of the second gripping device 26 comprises the driven gear 33, which is operated by a stepping motor. The teeth of the externally toothed driven gear 33, which may also be referred to as a drive gear, mesh with a section of the internally toothed gear 34, which may also be referred to as the output plate, which constitutes the output gear. One or several guide members are attached to the output plate. The guide members guide the output plate on a defined diameter in the accommodating portion 37 or the accommodating section. Accommodating sections for the guide members are provided in the accommodating section. The second gripper 28 with its gripping jaws 29, 30 is installed on the output plate. If the drive unit 35, i.e., the stepping motor, drives the drive gear 33, the second gripper 28 is thereby moved on the diameter path or circle path defined by the guide members 38 and the accommodating section 37. The advantage of the toothed transmission is that a point of rotation N of the second gear 34 or of the output plate, and thus a point of rotation of the second gripper 28, does not have to be congruent with the center P of the drive unit. This results in a compact system, which is required, because there is very little space within the adapter nest. Moreover, the gear transmission also entails an advantageous power transmission.

FIGS. 9 to 13 successively show the gripping of the five conductive members—the first conductive member 10, the second conductive member 11, the third conductive member 12, the fourth conductive member 13 and the conductive member 14—as is shown in FIGS. 2a to 2c.

In order for the conductive members to be oriented as it is shown in FIGS. 2a to 2c, the conductive members are rotated about the first conductive member end portion 16, so that all other limb ends, i.e., the second conductive member end portions 17 of a conductive member, are situated on an identical radius that the second gripper can drive along. For this purpose, the basic body 21 of the gripping apparatus 20, which is attached to a robot, for example, is rotated and/or pivoted accordingly. In particular, the non-movable first gripper 25 thus also rotates. Prior to the gripping of the respective conductive member, the gripping apparatus, in practice, is orientated relative to the conductive member to be respectively gripped and the second gripper is moved relative to the first gripper in such a way that the first and the second conductive member portion of the conductive member can be respectively gripped by the first and the second gripper at the same time. In this case, the control system of the gripping apparatus, for example, obtains from a feeding device for feeding the conductive members to the gripping apparatus, for example, information on the specific geometry of a conductive member to be respectively gripped, e.g., the spacing between the two conductive member portions and its position on the feeding device. The control system then orientates the gripping apparatus relative to the conductive member to be gripped and positions the second gripper relative to the first gripper in such a way that then, the first conductive member portion can be gripped by the first gripper and, simultaneously, the second conductive member portion by the second gripper.

Figure 9:
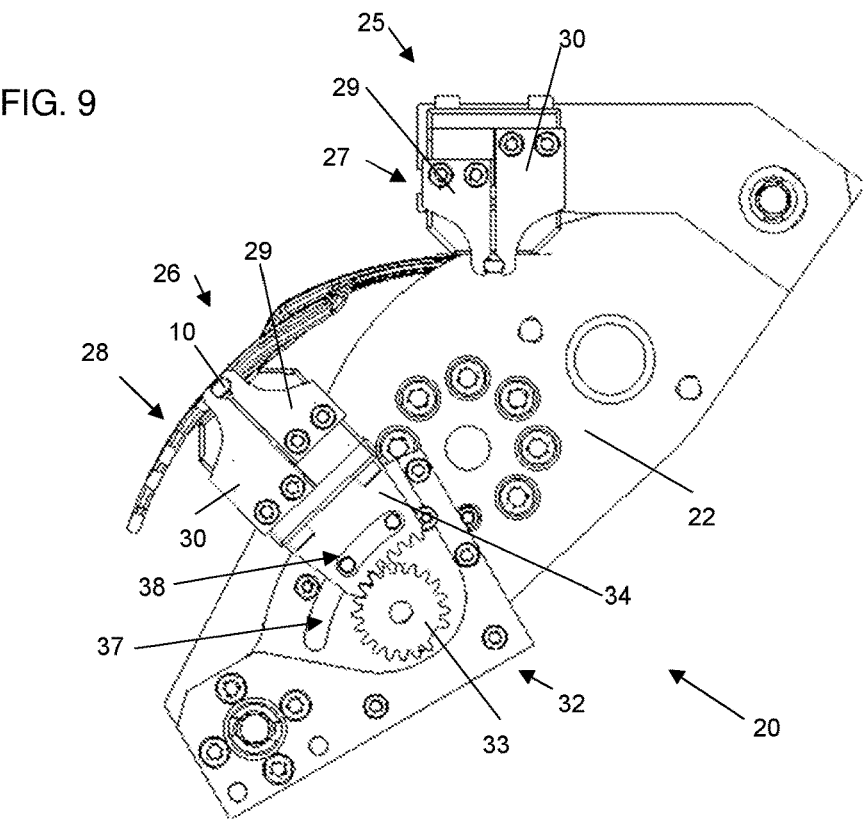
FIG. 9 shows a schematic representation in a perspective view of the gripping apparatus while gripping a first conductive member.
Figure 10:
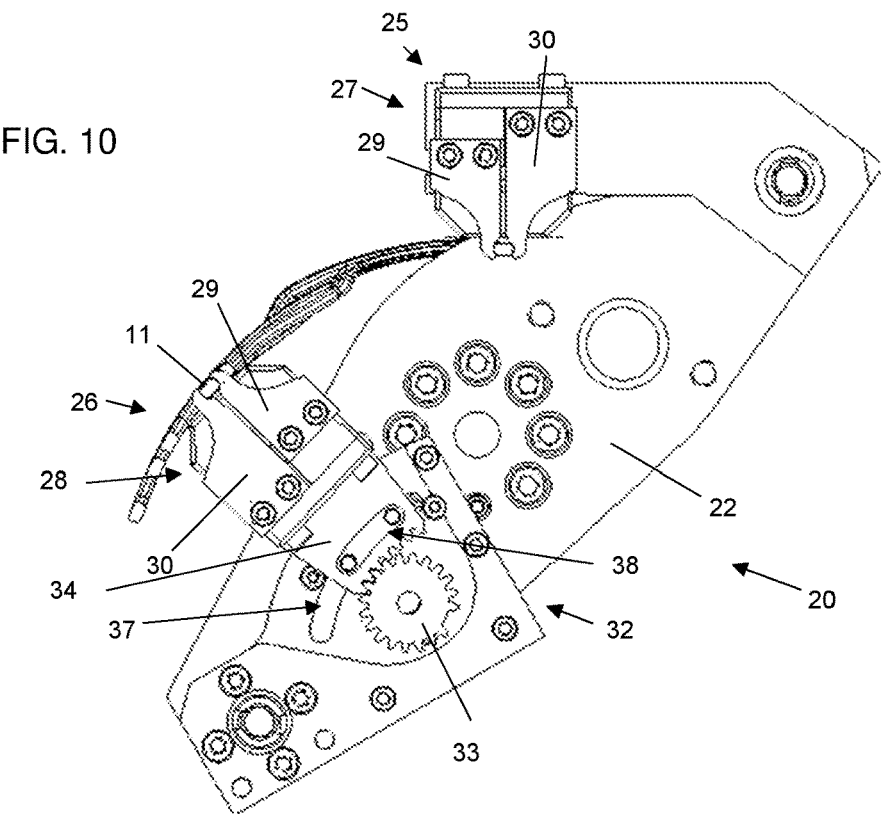
FIG. 10 shows a schematic representation in a perspective view of the gripping apparatus while gripping a second conductive member.
Figure 11:
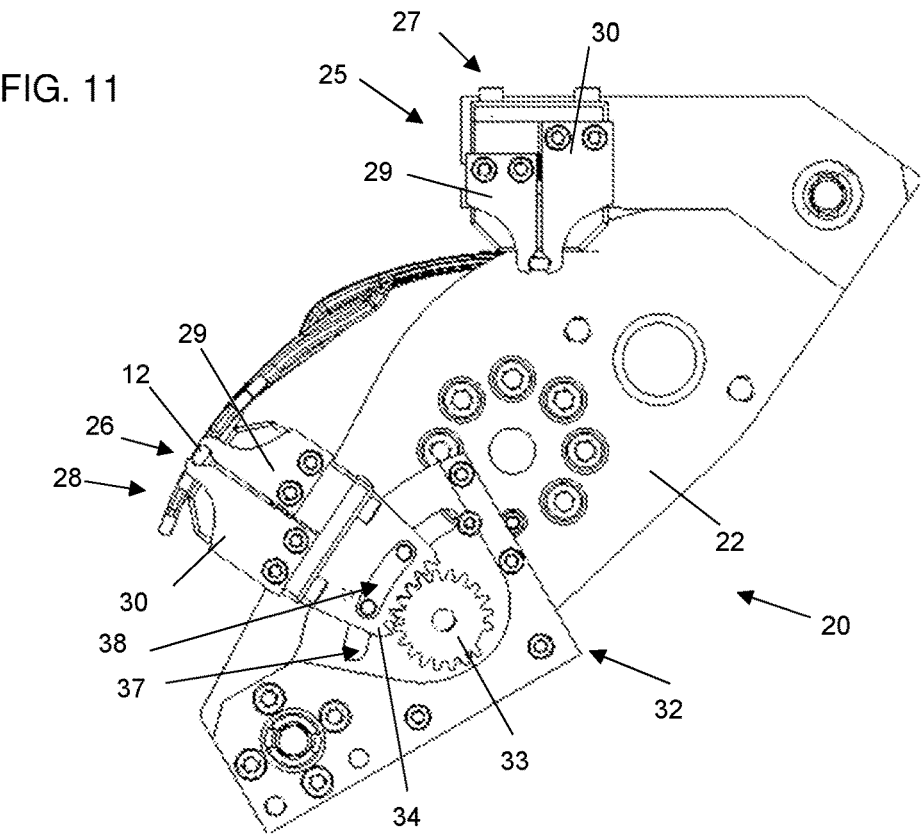
FIG. 11 shows a schematic representation in a perspective view of the gripping apparatus while gripping a third conductive member.
Figure 12:
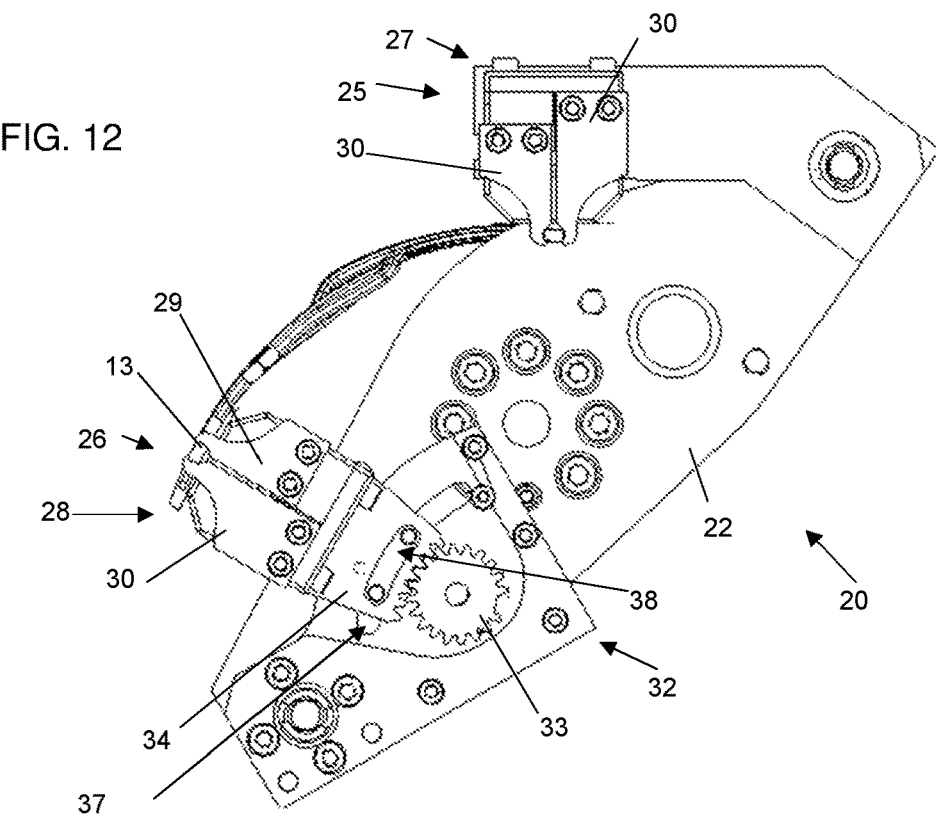
FIG. 12 shows a schematic representation in a perspective view of the gripping apparatus while gripping a fourth conductive member.
Figure 13:
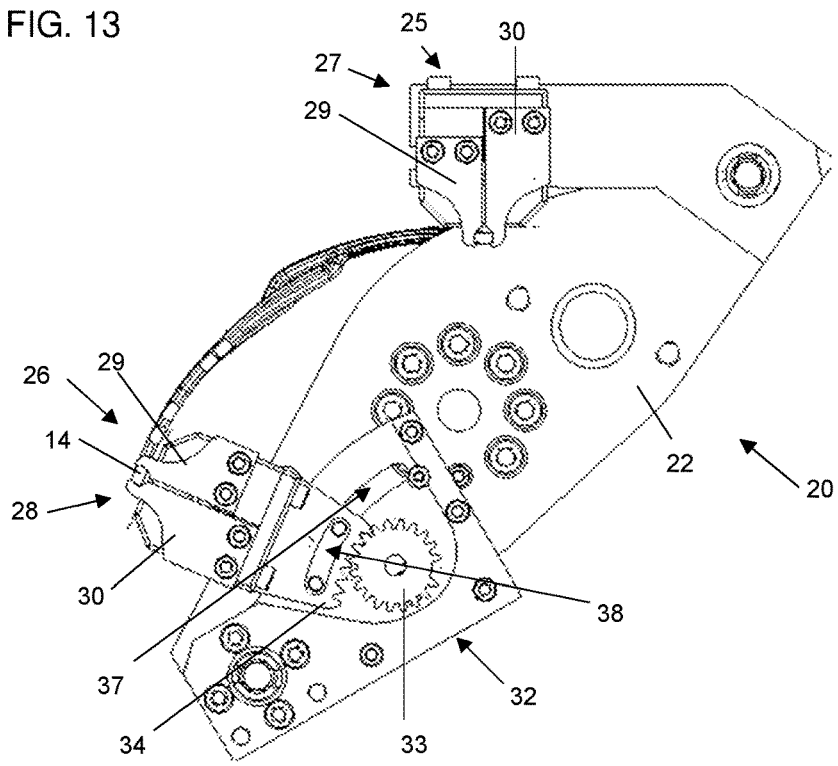
FIG. 13 shows a schematic representation in a perspective view of the gripping apparatus while gripping a fifth conductive member.

In FIGS. 9 to 13, the first gripper 27 with its gripping jaws grips the first conductive member end portion 16, and the second gripper 28 with its gripping jaws grips the second orientated conductive member end portion 17. During the gripping process, the first gripper 27 and/or the second gripper 28 close and clamp the conductive member between their gripping jaws 29, 30, which may also be referred to as clamping jaws. Thus, the conductive member is held, in particular, at its two spaced-apart conductive member end portions 16, 17. When gripping the respective conductive members, the first gripper 27 remains stationary, i.e., does not move, and the second gripper 28 moves relative to the first gripper 27 or the basic body 21 towards the respective second conductive member end portion 17 of the respective conductive member along the predetermined circular path 39. In this example, this results in five different gripping points for the gripper 28, towards which the second gripper 28 has to move. In order to grip the second conductive member end portion 17, the second gripper 28 moves in the counter-clockwise direction along the circular path 39. In FIG. 9, the gripping apparatus 20 grips the first conductive member 10, in FIG. 10 the second conductive member 11, in FIG. 11 the third conductive member 12, in FIG. 12 the fourth conductive member 13, and in FIG. 13 the fifth conductive member 14. FIGS. 9 to 13 are supposed to illustrate that, if the different conductive members are rotated about the limb axis 19 or the gripping apparatus has been orientated accordingly towards the conductive member to be gripped, the second conductive member end portions 17 or second limbs are always situated on the circle radius relative to the gripping apparatus, and that thus, the conductive members, despite their different geometries, can be gripped at the second conductive member end portion 17 or end by simple kinematics of the second gripping device 26.

The gripping apparatus is used for pre-fitting the conductive members, particularly after a bending process. Pre-fitting is understood to be the positioning of the individual conductive members to form crowns. The crowns or hairpin crowns are then introduced into the stator and/or rotor by one or more joining processes. The positioning of the conductive members to form crowns is carried out by means of an adapter nest 40 into which the conductive members are pre-fitted.

Figure 14:
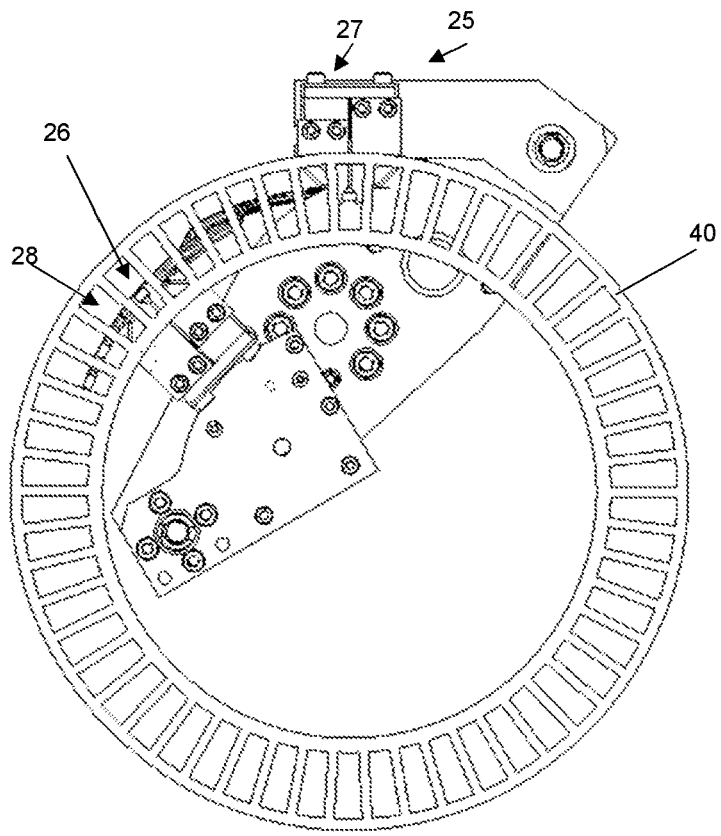
FIG. 14 shows a schematic representation of the gripping apparatus while pre-fitting the individual conductive members into a pre-fitting nest.

The pre-fitting of the gripped conductive member into the adapter nest 40 is shown in FIG. 14. For further details of pre-fitting, reference is made here to WO 2018/233774 A1 and WO 2018/233771 A1. The adapter nest 40 in FIG. 14 is configured for forming two crowns from the conductive members. However, more than two crowns may also be formed. During assembly, one conductive member is gripped individually and fitted into the adapter nest or pre-fitting device or accommodating section. Depending on the configuration of the stator and/or rotor, different pre-fitting movements with the gripping apparatus 20 are required to be able to realize the weaving of the crowns or of the conductive members to form crowns. Thus, different positions of the two grippers—first gripper 27 and second gripper 28—or of the gripping devices 25, 26 are necessary.

Figure 15:
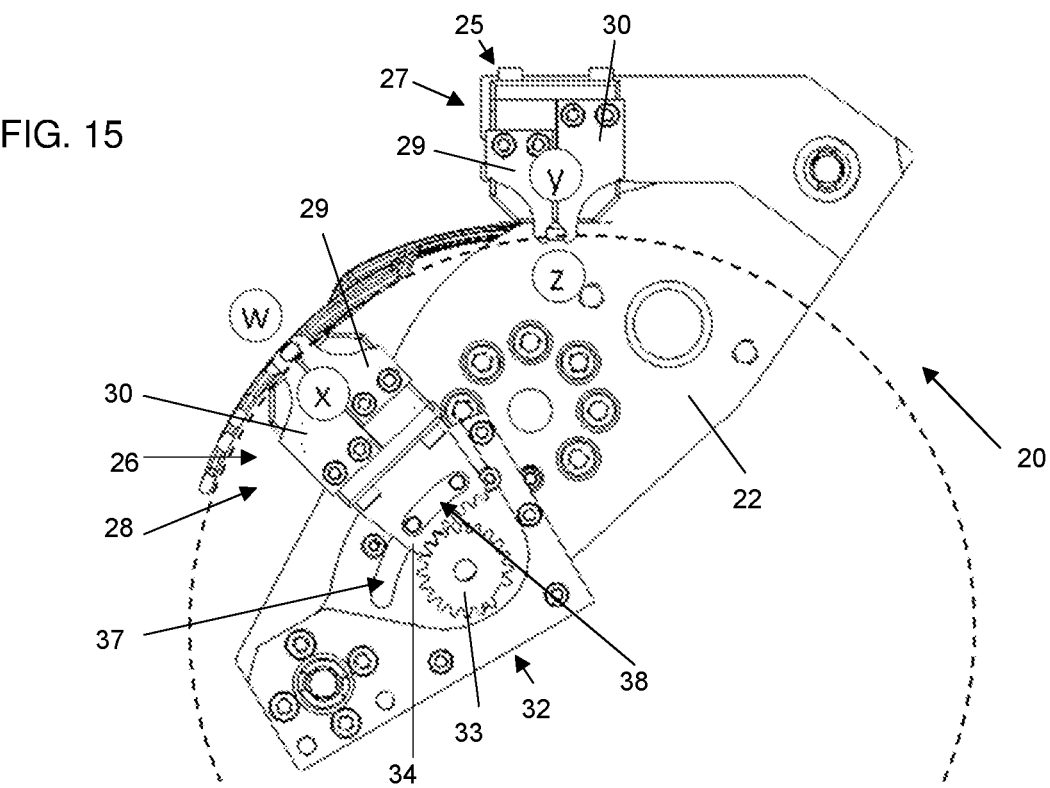
FIG. 15 shows a schematic representation of the gripping apparatus with positioning options of the first and second grippers.

FIG. 15 shows positioning options of the first gripper 27 and the second gripper 28 relative to the circular path 39. The first gripper 27 may be arranged inside the circular path 39 at the position z, and the second gripper 29 may be arranged outside the circular path 39 at the position w. In addition or as an alternative, the first gripper 27 may be arranged outside the circular path 39 at the position y, and the second gripper 28 may be arranged inside the circular path 39 at the position x. In addition or as an alternative, the first gripper 27 may be arranged outside the circular path 39 at the position y, and the second gripper 28 may be arranged outside the circular path at the position w. In addition or as an alternative, the first gripper 27 may be arranged inside the circular path 39 at the position z, and the second gripper 28 may be arranged inside the circular path 39 at the position x. In FIG. 15, the first gripper is arranged at the position y outside the circular path 39, and the second gripper 28 at the position x inside the circular path 39.

The gripping apparatus 20 with another embodiment of the first gripping device 25 and the second gripping device 26 is described in connection with FIGS. 16 to 19.

Also in this case, the gripping apparatus 20 comprises the basic body 21 having a base plate 22, a first arm member 23 and a second arm member 24. The gripping apparatus 20 further comprises a first gripping device 25 and a second gripping device 26. The base plate 22 is configured as a plate-shaped workpiece or as a plate. The first arm member 23 is disposed on the base plate 22, on a surface at a predetermined portion of the base plate 22, particularly at an end portion, and the second arm member 24 is disposed at another predetermined portion, in particular an opposite end portion, on the surface of the base plate 22. In other words, the first arm member 23 and the second arm member 24 are disposed at a predetermined distance from each other, in particular opposite each other, particularly preferably parallel to each other, on the base plate 22. Here, the two arm members—the first arm member 23 and the second arm member 24—extend perpendicularly or vertically to the base plate 22, particularly to the surface of the base plate 22 against which the two arm members 23, 24 rest. The two arm members 23, 24 may be configured, for example, as a bar or rod or rail.

In other words, the gripping apparatus 20 comprises two gripping arms, which are referred to as arm members 23, 24, on each of which one gripper—first gripper 27 and second gripper 28—is installed. The gripping arms are installed on the base plate 22. This base plate is installed on a handling device, such as a robot or the like, and moved by it.

The first gripping device 25 is disposed on or fixed to the first arm member 23. In other words, the first arm member 23 holds or supports the first gripping device 25. In this case, the first arm member 23 is disposed on the base plate 22 with one end. The first gripping device 25 is arranged on an end of the first arm member 23 opposite the one end, or opposite the base plate 22. In other words, the first arm member 23 is disposed between the base plate 22 and the first gripping device 25.

Furthermore, the second arm member 24 is disposed on or attached to the base plate 22 with one end. The second gripping device 26 is arranged on or attached to an end of the second arm member 24 opposite the one end, or opposite the base plate 22. In other words, the second arm member 24 is disposed between the base plate 22 and the second gripping device 24. In other words, the gripping apparatus 20 includes the base plate 22, on which two arms or arm members 23, 24 are arranged. A gripping device 25, 26, each of which is supposed to grip one of the two conductive member end portions 16, 17, or, together, one of the two conductive member end portions 16, 17, is installed on each of these arms.

The first gripping device 25 includes the first gripper 27, and the second gripping device 26 includes the second gripper 28. For example, the first gripper 27 and/or the second gripper 28 are configured as, in particular pneumatic, parallel grippers.

Figure 6:
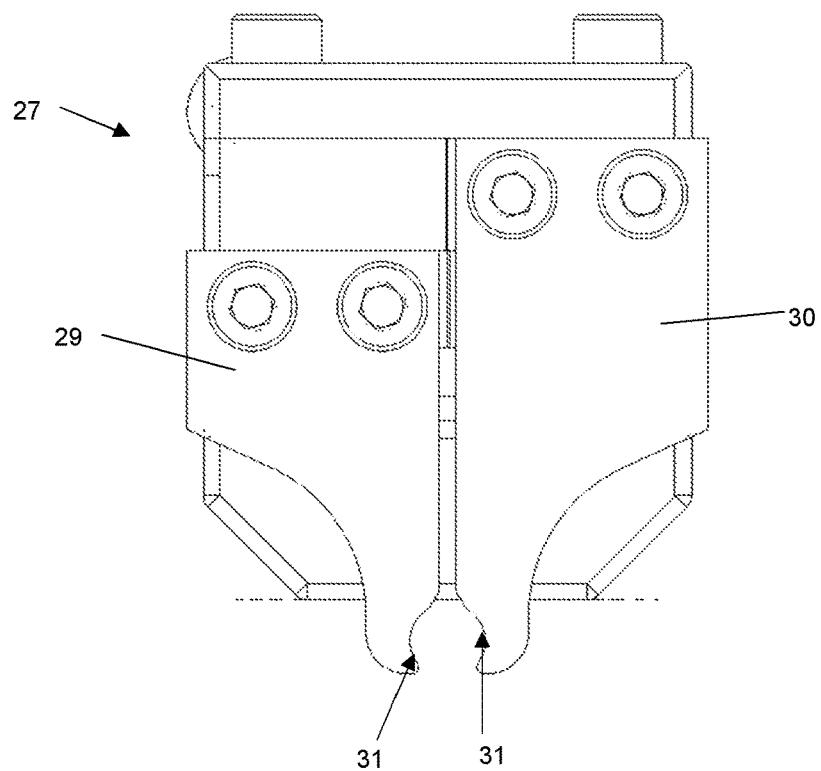
FIG. 6 shows a schematic representation of a gripper with two gripping jaws.
Figure 18:
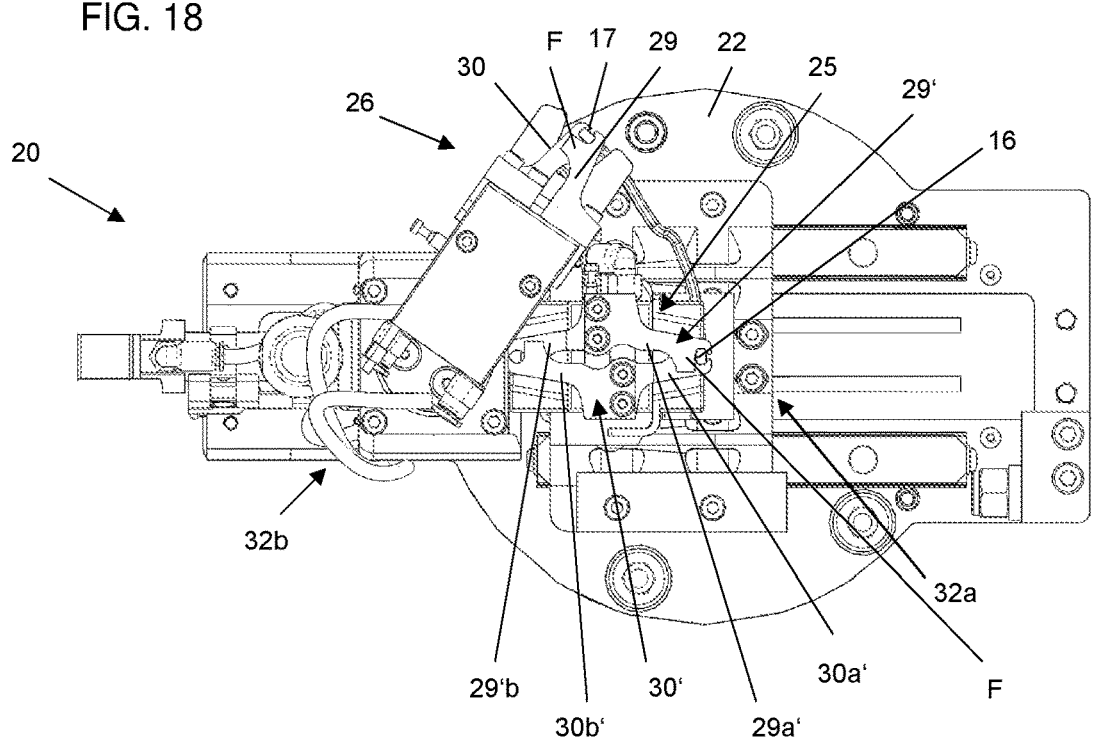
FIG. 18 shows a schematic representation of the gripping apparatus of FIG. 16 in a view from below onto the first gripper and the second gripper.
Figure 19:
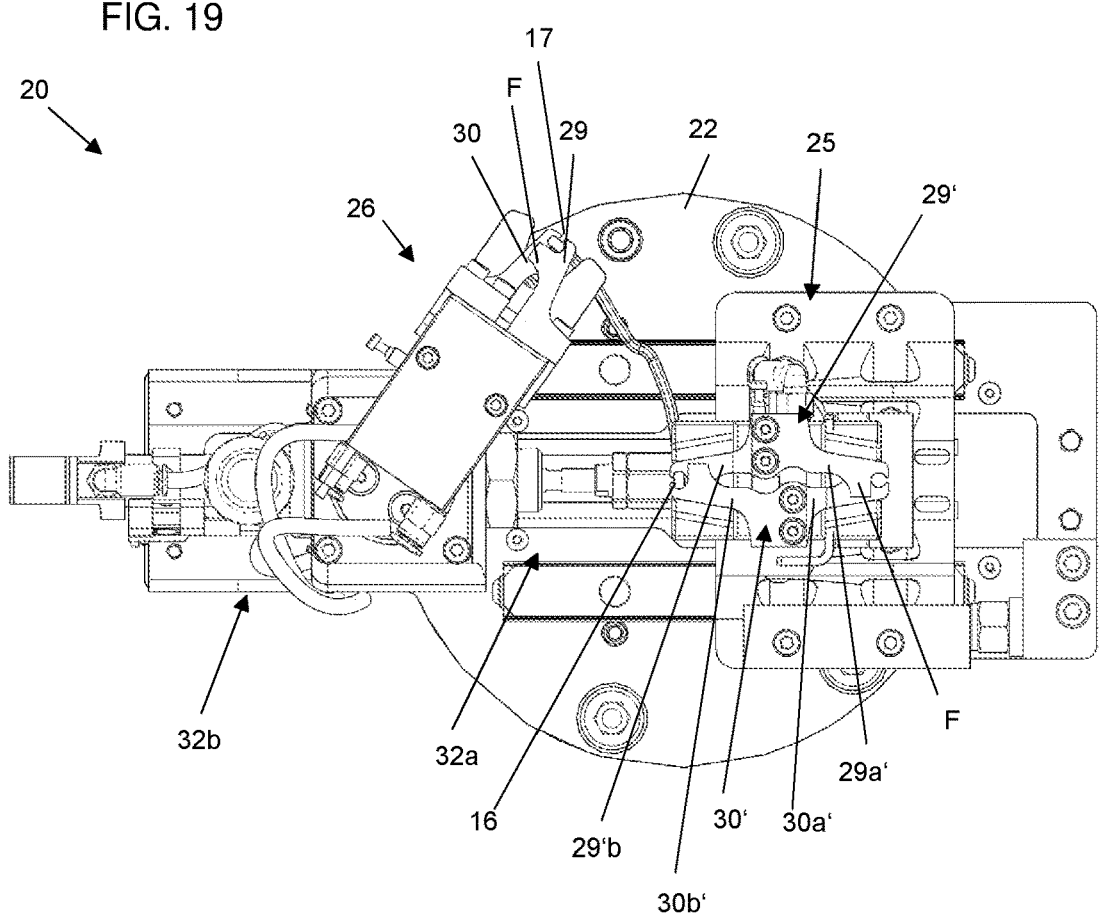
FIG. 19 shows a schematic representation of the gripping apparatus of FIG. 17 in a view from below onto the first gripper and the second gripper.

The second gripper 28 is built or configured similar to the grippers described in connection with FIG. 6. The second gripper 28 is configured for gripping, in particular with its gripping jaws, the conductive member at the second conductive member end portion 17, or also at the first conductive member end portion 16. In this case, the gripping surface 31 of the second gripper 28 grasps the second conductive member end portion 17 or the first conductive member end portion 16. As shown in FIGS. 18 and 19, the second gripper 28 has two gripping jaws—a first gripping jaw 29 and a second gripping jaw 30. Both gripping jaws 29, 30 have one gripping surface 31 each. In this case, the gripping surface 31 of the gripping jaw 29, 30 is curved inward or configured to be concave or moon-shaped. Unlike the gripping jaws of the second gripper 28 in FIG. 6, the first gripping jaw 29 has an appendage F. The appendage F extends from the first gripping jaw 29 in the direction of the second gripping jaw 30. The appendage F includes or forms a part of the gripping surface 31. Due to the appendage F, the first gripping jaw 29 overlaps the second gripping jaw 30. The second conductive member end portion 17 or first conductive member end portion 16 accommodated between the gripping jaws 29, 30 is enclosed by the appendage F and/or the gripping surface 31. In addition or as an alternative, the second gripping jaw 30 may also have this appendage. In that case, the appendage F extends from the second gripping jaw 30 in the direction of the first gripping jaw 29. The appendage F includes a part of the gripping surface 31. Due to the appendage F, the first gripping jaw 29 overlaps the second gripping jaw 30.

The second gripper 28 is configured to be movable. The second gripper 28 is movable relative to the base plate 22 or the basic body 21 and/or the first gripper 27 or the first gripping device 25. In order to move the second gripper 28, the second gripping device 26 comprises a second moving unit 32*b*. The second moving unit 32*b* is configured differently than the moving unit 32 as it was described in connection with FIGS. 7 and 8. The second moving unit 32*b* comprises a mechanism for rotating the second gripper 28. In particular, the second moving unit 32*b* has a rotating mechanism. In other words, the second gripper 28 can be rotated. For this purpose, the second moving unit 32*b* or the second gripping device 26 has a pivot axle D. In this case, the second gripping arm 24 has a pivot axle D, which is configured for moving or rotating the second gripper 28, at an end portion, particularly the one on which the second gripper 28 is disposed, particularly preferably opposite the base plate 22. In particular, "pivot axle" refers to an axis about which a rotation takes place. In particular, this pivot axle D makes it possible to grip different geometries of hairpins, e.g., different limb spacings of the hairpins, with this gripping apparatus 20.

The first gripper 27 is configured for gripping, in particular with its gripping jaws, the conductive member at the first conductive member end portion 16 or at the second conductive member end portion. In this case, the gripping surface 31 of the first gripper 27 grasps the first conductive member end portion 16 or the second conductive member end portion 17.

Furthermore, the first gripper 27 and/or the first arm member 23 and/or the first gripping device 25 are disposed so as to be linearly movable. In other words, the first gripper 27 and/or the first arm member 23 and/or the first gripping device 25 are configured for carrying out a linear movement. For moving the first gripper 27 and/or the first arm member 23 and/or the first gripping device 25 or for carrying out the linear movement thereof, the gripping apparatus 20 preferably has a first moving unit 32*a*. The first moving unit 32*a* is configured for moving the first gripper 27 and/or the first arm member 23 and/or the first gripping device 25 relative to the basic body 21 and/or the second gripper 28. In other words, the first gripper 27 and/or the first arm member 23 of the first gripping device 25 and/or the first gripping device 25 can be moved by means of the first moving unit 32*a*. In other words, the first gripper 27 and/or the first arm member 23 and/or the first gripping device 25 can be installed on the first moving unit 32*a*, which permits a linear movement, particularly as a relative movement relative to the base plate 22.

Figure 16:
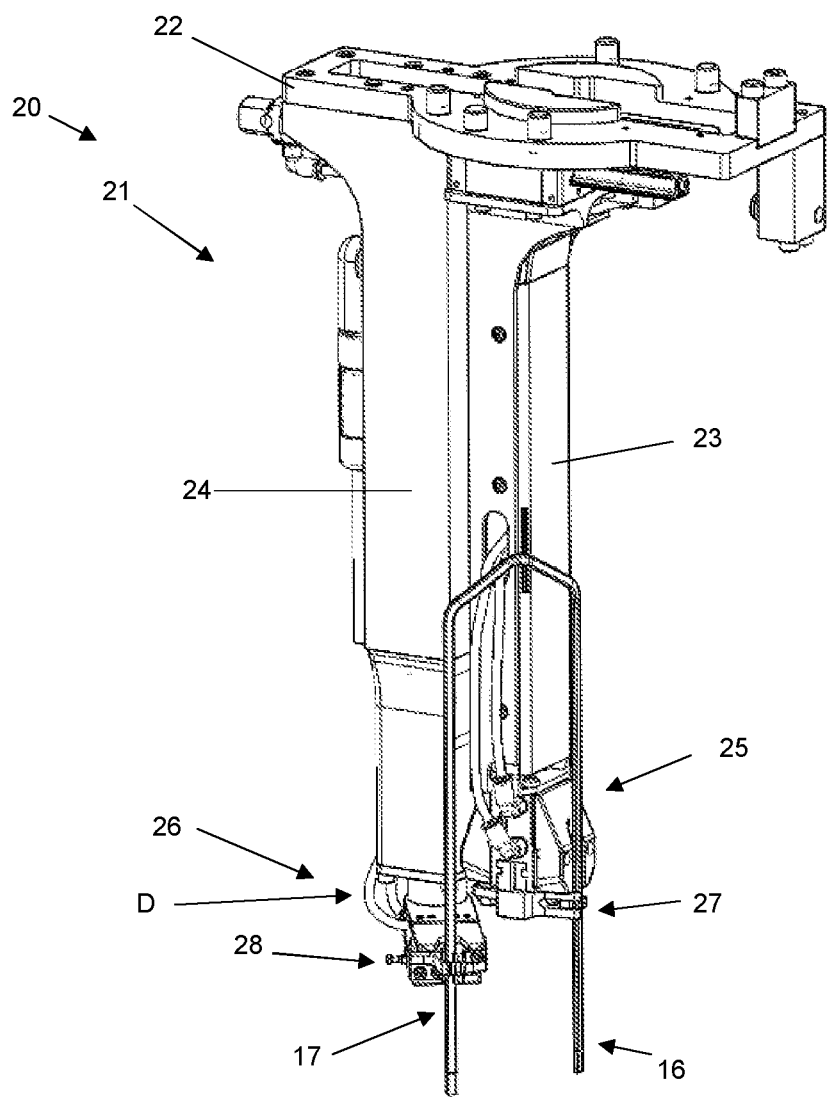
FIG. 16 shows a schematic representation of a gripping apparatus with a basic body, an alternative first gripping device comprising a first gripper, and an alternative second gripping device comprising a second gripper and a moving unit for moving the second gripper, while gripping a conductive member from one side, in a perspective view.
Figure 17:
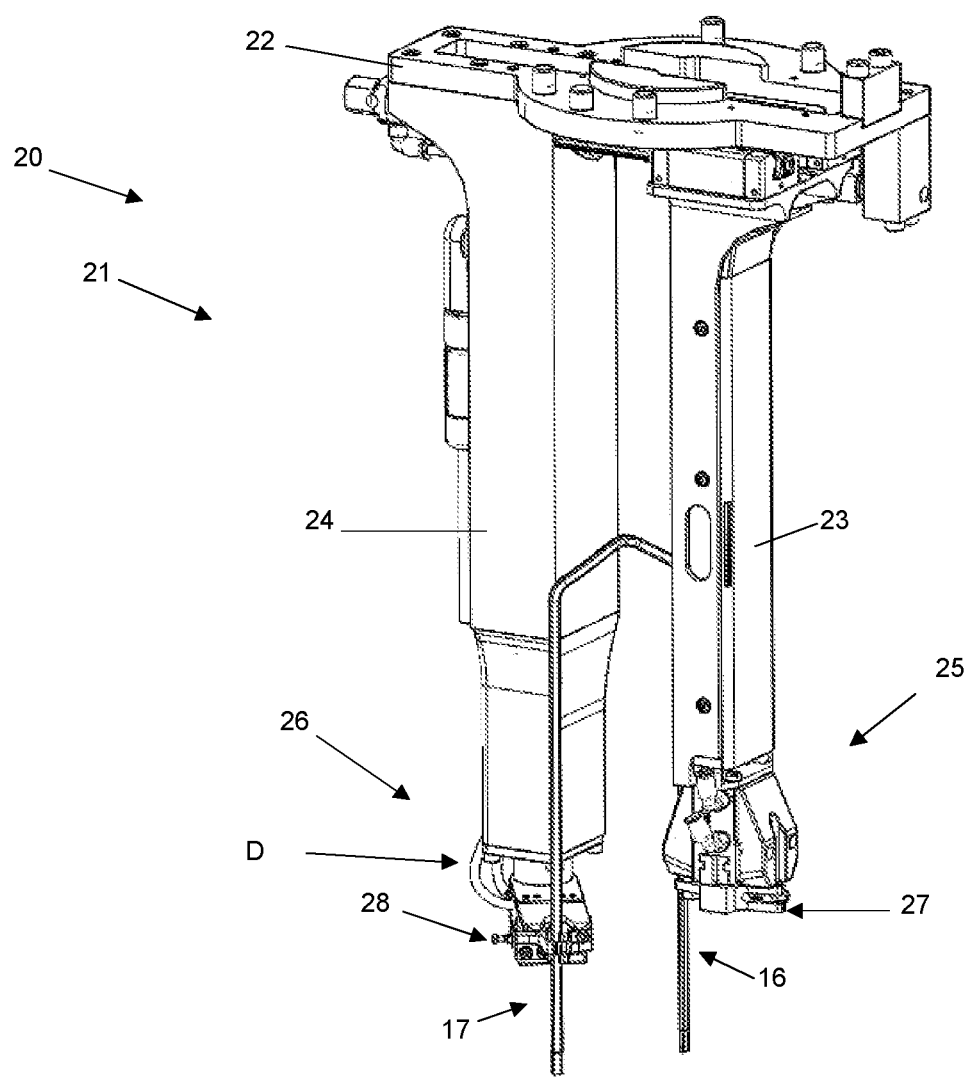
FIG. 17 shows a schematic representation in a perspective view of the gripping apparatus of FIG. 16 while gripping the conductive member from opposite sides.

Due to this linear movement, a hairpin can be gripped in various manners. If the first arm member 23, i.e., the first gripping arm, is located in its left-hand position as shown in FIGS. 16 and 18, a hairpin can be gripped from one side; that is, relative to the hairpin, the two grippers, i.e., the first gripper 27 and the second gripper 28, are located on one hairpin side. If the first arm member 23, i.e., the first gripping arm, is located in its right-hand position as shown in FIGS. 17 and 19, a hairpin can be gripped from both sides; that is, relative to the hairpin, one gripper is located on the one hairpin side, whereas the other gripper is located on the other hairpin side.

The first moving unit 32*a* may have a rail, for example, which is arranged on a surface or side of the base plate 22 facing towards the first gripper 27 and the second gripper 28. In this case, the first arm member 23 can be moved along the rail. Moreover, the first moving unit 32*a* for moving or displacing the first arm member 23 may comprise a cylinder. For example, the first moving unit 32*a* may comprise a lifting cylinder or gas pressure spring.

Furthermore, the first gripper 27 and the second gripper 28, with respect to their heights, are arranged with an offset relative to each other. In other words, the first gripper 27 and the second gripper 28 can be arranged differently or with an offset relative to each other in the vertical direction of the gripping apparatus 20.

Figure 20:
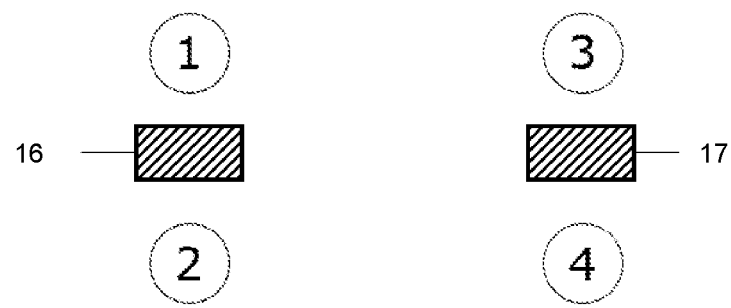
FIG. 20 shows a schematic representation of four gripping positions of the first gripper and/or the second gripper.

FIG. 20 schematically shows the two limbs of a hairpin, i.e., a conductive member, with the first conductive member end portion 16 and the second conductive member end portion 17 in a sectional view and four possible positions 1, 2, 3, 4 of one gripper or of the two grippers 27, 28 of the gripping apparatus 20. The combination of a handling device and a gripping apparatus 20, i.e., a system comprising the handling device and the gripping apparatus 20, permits all imaginable variants of gripping positions. That means that each of the two grippers 27, 28 in any combination can move to any gripping position 1, 2, 3, 4. If, for example, the first gripper 27 assumes the gripping position 1, the second gripper 28 can then move towards all four possible gripping positions 1, 2, 3, 4. Alternatively, for example, the second gripper 28 may move towards the gripping position 1, and the first gripper 27 towards all four possible gripping positions 1, 2, 3, 4. In the process, the second gripper 28 may also move towards the identical gripping position of the first gripper 27, or the first gripper 27 may move towards the identical gripping position of the second gripper 28. It is thus possible for the first gripper 27 and the second gripper 28 to be arranged with an offset relative to each other with respect to their heights. It is thus possible that only one limb, i.e., conductive member end portion, e.g., the first conductive member end portion 16 or the second conductive member end portion 17, is gripped by both grippers 27, 28. This flexibility affords the greatest advantages with regard to loading and unloading of the hairpin, i.e., the conductive member, into or from various (production) units. Thus, the hairpin does not have to be transferred from a (production) unit to the gripping apparatus in a defined manner, because the gripping apparatus is capable of adapting to the respective (production) unit. This results in a considerably simplified construction effort for the individual (production) units and, at the same time, provides considerable cycle time advantages in the production of hairpins and the transport of hair pins.

Figure 21:
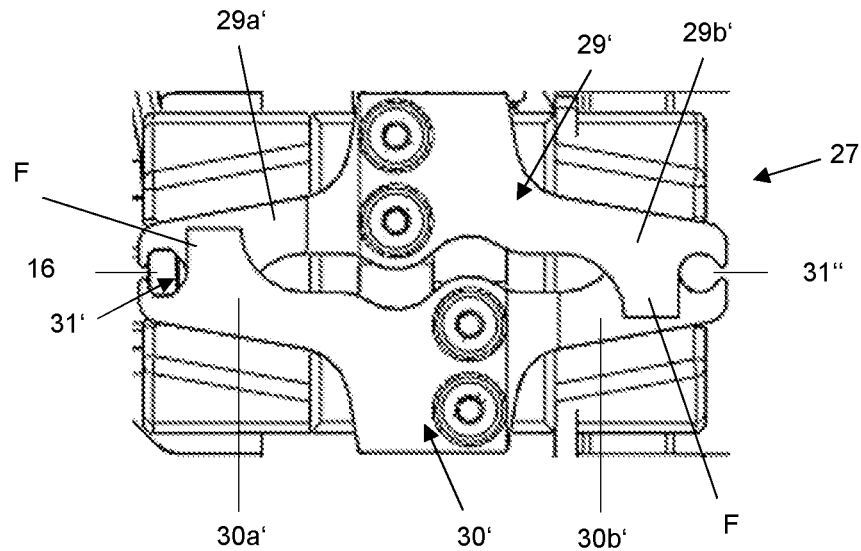
FIG. 21 shows a schematic representation of another embodiment of the first gripper as a double gripper.

As is apparent from FIG. 21, the first gripper 27 in the embodiments of FIGS. 16 to 19 has a different configuration from that of the first gripper 27 in the embodiments of FIGS. 3 to 15. Apart from the fact that the first gripper 27 is configured to be movable, the first gripper 27 has two gripping points. The first gripper 27 has two gripping jaws 29', 30' for this purpose. The two gripping jaws 29', 30' comprise two gripping jaw members 29*a'*, 30*a'*, 29*b'*, 30*b'*. The gripping jaw members 29*a'*, 30*a'*, 29*b'*, 301*b'* are arranged opposite each other. The first gripping jaw member 29*a'* of the first gripping jaw 29' is assigned or allocated to the first gripping jaw member 30*a'* of the second gripping jaws 30'. Each gripping jaw member 29*a'*, 30*a'*, 29*b'*, 30*b'* has a gripping surface. The first gripping jaw member 29a' of the first gripping jaw 29' and the first gripping jaw member 30a' of the second gripping jaw 30' each have a first gripping surface 31'. The second gripping jaw member 29b' of the first gripping jaw 29' and the second gripping jaw member 30b" of the second gripping jaw 30' each have a second gripping surface 31". Together, the first gripping jaw member 29a' of the first gripping jaw 29' and the first gripping jaw member 30a' of the second gripping jaws 30' form or comprise a first gripping point. The second gripping jaw member 29b' of the first gripping jaw 29' is assigned or allocated to the second gripping jaw member 30b' of the second gripping jaws 30'. Together, the second gripping jaw member 29a' of the first gripping jaw 29' and the second gripping jaw member 30b' of the second gripping jaw 30' form or comprise a second gripping point. In particular, the two gripping points are formed thereby. The first gripping surface 31' and the second gripping surface 31" are arranged so as to be opposite or facing towards each other. The first gripping jaw member 29a' of the first gripping jaw 29' and the first gripping jaw member 30a' of the second gripping jaw 30' as well as the second gripping jaw member 29b' of the first gripping jaw 29' and the second gripping jaw member 30b' of the second gripping jaw 30' may be configured like the second gripper 28, or its gripping jaws with the appendage F, which was already described in connection with FIGS. 18 and 19. Only, the first gripper has two pairs of these gripping jaws, which are arranged opposite each other. The gripping jaws or jaws of the first gripper 27 formed in this manner make it possible that both gripping points can be closed or opened with only a single gripper, and that it is not necessary to install two actuators or grippers—which would result in considerable problems regarding space and weight. Depending on the position of the right arm, i.e., the first arm member 23, either the gripping point 1 or the gripping point 2 is in the active position—i.e., arranged such that it is able to grip a hairpin limb.

Alternatively, the first gripper 27 may be configured like the second gripper 28. Instead of the first gripper 27 being linearly displaced, the first gripper 27 and/or the first arm member 23 may then be rotated about a pivot axle.

On the whole, the gripping of hairpins by means of a gripping apparatus is described by embodiments of the invention.

The gripping concept entails the gripping of all hairpins at the limbs by means of a stationary or non-movable gripper. Then, five gripping positions result on the other side.

First, one limb each of all the different hairpins are placed one above the other in a congruent manner. Then, all hairpins are rotated about the limb axis M so as to result in a common diameter D at all other limb ends. Then, only one actuator moves towards all the different limb positions of the other limbs. Thus, the device is made cost-effective and, above all, compact.

The entire gripping system may be installed on a robot, for example. The gripping system comprises a base plate, which is screwed-connected with or to a robot and to which two arms are screwed. One gripper, which is supposed to grip one of the two hairpin limbs in each case, is installed on each of these arms. The movable gripper is installed on the second arm, and the stationary arm is installed on the first arm. In the present case, two parallel grippers are used for gripping the limbs. At their gripping surfaces, the gripping jaws of the parallel gripper have a round configuration. Thus, a rotation in the respective parallel gripper is prevented only by the fact that each hairpin is also gripped at its second limb by the other parallel gripper. The one parallel gripper is stationary or non-movable. The other parallel gripper can move towards the different positions of the second limbs. The accommodating section of the movable gripper contains the mechanism for the movement.

A mechanism moves the second gripper. The mechanism comprises a driven gear, which may be operated by a stepping motor, for instance. The teeth of the externally toothed driven gear or drive gear mesh with a section of the internally toothed gear or output plate, which constitutes the driven gear. One or several guide members are attached to the output plate. The guide members guide the output plate on a defined diameter in the accommodating section. Accommodating sections for the guide members are provided in the accommodating section. The accommodating sections may be realized by means of grooves. The second gripper with its gripping jaws is installed on the output plate. If the drive unit drives the drive gear, the parallel gripper is thereby moved on the diameter path defined by the guide members and their accommodating section. Thus, all of the different hairpins of a stator can be picked up and gripped in a defined manner by the predetermined or specific arrangement of the hairpins.

The advantage of the gear transmission is that the point of rotation and thus the point of rotation of the gripper do not have to be congruent with the center of the drive unit P. This results in a very compact system, because P is much closer to the dashed line than N. Moreover, the gear transmission also entails an advantageous power transmission. At present, the gripping system is used for pre-fitting hairpins after the bending process. Pre-fitting is understood to be the positioning of individual hairpins to form hairpin crowns. The hairpin crowns are then inserted into the stator and/or rotor by one or more joining processes. The positioning of the hairpins to form crowns is carried out using adapter nests, into which the hairpins are pre-fitted. Depending on the configuration of the stator, different pre-fitting movements with the gripping system are required to be able to realize the weaving of the hairpins or of the crowns. This requires different positions of the two gripping arms with a stationary and a movable gripper. However, all other combinations of positions relative to the diameter are conceivable for the two grippers.

In addition to the pre-fitting of the hairpins, however, the device can also be conceivably used for all other handling processes of items having two limbs, whose positions vary.

According to an alternative embodiment, the gripping apparatus has two gripping arms or arm members on which one gripper, e.g., a pneumatic parallel gripper or the like, is installed in each case. The gripping arms are installed on a base plate. This base plate is installed on a handling device, e.g., a robot or the like, and moved by it.

In the lower region, the second gripping arm has a pivot axle which is able to move the gripper of the second arm. This pivot axle makes it possible to grip different geometries of hairpins, e.g., different limb spacings, with this gripping system.

The first gripping arm or the first gripper of the first gripping arm is installed on a moving unit, which permits a linear movement, particularly a relative movement relative to the base plate. The same effect can be obtained if the first gripping arms can be rotated about the limb center of the right-hand limb. Due to this linear movement, a hairpin can be gripped in various manners. If the first gripping arm is located in its left-hand position, a hairpin can be gripped from one side; that is, relative to the hairpin, the two grippers, i.e., the gripper of the second gripping arm and the gripper of the first gripping arm, are located on one hairpin side. If the second gripping arm is located in its right-hand position, a hairpin can be gripped from both sides; that is, relative to the hairpin, one gripper is located on the one hairpin side, whereas the other gripper is located on the other hairpin side. The linear movement of the first arm member makes the gripping system extremely flexible.

In summary, it can be said that the combination of a handling device, particularly a robot or the like, on which the above-described gripping apparatus is mounted, with the above-described gripping apparatus permits hairpins to be gripped in an extremely flexible manner. The combination of a handling device and a gripping apparatus permits all imaginable variants of gripping positions. That means that each of the two grippers in any combination can move to any gripping position. If, for example, a gripper assumes one gripping position, the other gripper can then move towards four possible gripping positions—even the identical gripping position of the other gripper. This is possible because the two grippers are arranged with an offset relative to each other with respect to their heights. It is thus possible that only one limb of the hairpin, i.e., one conductive member end portion, is gripped by both grippers. This flexibility affords the greatest advantages with regard to loading and unloading of the hairpin into or from various (production) units. Thus, the hairpin does not have to be transferred from a (production) unit to the gripping system in a defined manner, because the gripping system is capable of adapting to the respective (production) unit. This results in a considerably simplified construction effort for the individual (production) units and, at the same time, provides considerable cycle time advantages in the production of hairpins and the transport of hair pins.

The gripping jaws of the first gripper are formed in a special manner. Said gripping jaws haven not only a single gripping point, as is the case for the second gripper, but two gripping points. The jaws formed in this manner make it possible that both gripping points can be closed or opened with only a single gripper, e.g., a pneumatic gripper, and that it is not necessary to install two actuators—which would result in considerable problems regarding space and weight. Depending on the position of the first arm, either the gripping point 1 or the gripping point 2 is in the active position—i.e., arranged such that it is able to grip a hairpin limb.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 First conductive member
11 Second conductive member
12 Third conductive member
13 Fourth conductive member
14 Fifth conductive member
15 Sixth conductive member
16 First conductive member end portion
17 Second conductive member end portion
18 Circle line
19 Limb axis
20 Gripping apparatus
21 Basic body
22 Base plate
23 First arm member
24 Second arm member
25 First gripping device
26 Second gripping device
27 First gripper
28 Second gripper
29 First gripping jaw
29' First gripping jaw
29a' First gripping jaw member
29b' Second gripping jaw member
30 Second gripping jaw
30' Second gripping jaw
30a' First gripping jaw member
30b' Second gripping jaw member
31 Gripping surface
31' First gripping surface
31" Second gripping surface
32 Moving unit
32a First moving unit
32b Second moving unit
33 First gear
34 Second gear
35 Drive unit
36 Accommodating unit
37 Accommodating portion
38 Guide member
39 Circular path
40 Adapter nest
D Pivot axle
F Appendage

The invention claimed is:

1. A gripping apparatus for gripping at least one conductive member of several conductive members, wherein the gripping apparatus is configured to grip different geometries of conductive members, wherein the at least one conductive member comprises a first conductive member end portion and a second conductive member end portion, the gripping apparatus comprising:
   a basic body includes a base plate, a first arm member and a second arm member are attached to the base plate, wherein the first arm member and the second arm member extend vertically with respect to the base plate from first ends attached to the base plate to free second ends, an attachment between the first end of the first arm member and the base plate is linearly movable relative to the base plate,
   a first gripping device includes a first gripper having a first pair of closable jaws, wherein the first gripping device is coupled to the free second end of the first arm member, and
   a second gripping device includes a second gripper having a second pair of closable jaws, wherein the second gripping device is coupled to the free second end of the second arm member,
   wherein the first gripping device is configured to grip the first conductive member end portion or the second conductive member end portion of the at least one conductive member by the first pair of closable jaws, wherein the second gripping device is configured to move relative to the basic body and the first gripper such that the second gripper grips the at least one conductive member at the second conductive member end portion or at the first conductive member end portion by the second pair of closable jaws.

2. The gripping apparatus according to claim 1, wherein at least one of

- at least one of the first gripper and the first gripping device moves relative to at least one of the base plate or the second gripper;
- at least one of the first gripper and the first gripping device moves linearly relative to the base plate with the attachment;
- at least one of the second gripper, the second gripping device, or the second arm member is rotatably mounted about a pivot axle;
- the first gripper rotates about a center of the first conductive member end portion or second conductive member end portion to be gripped;
- the first gripper and the second gripper are arranged with an offset relative to each other in a vertical direction.

3. The gripping apparatus according to claim 1, wherein at least one of

- the second gripping device further comprises a moving unit operatively connected to the second arm member and the base, the moving unit configured to move the second gripper relative to the basic body;
- the second gripping device further comprises a moving unit operatively connected to at least one of the second gripper or the second arm member, the moving unit configured to move the at least one of the second gripper of the second arm member relative to the basic body along a circular path; and
- wherein the second gripping device further comprises a moving unit operatively connected to at least one of the second gripper or the second arm, the moving unit configured to rotate the at least one of the second gripper or the second arm member, and the at least one of the second gripper or the second arm member is rotatably mounted about a pivot axle.

4. The gripping apparatus according to claim 1, wherein each of the first and second pairs of closable jaws have respective gripping surfaces, and wherein each respective gripping surface has a concave configuration.

\* \* \* \* \*